(12) United States Patent
Lucidarme et al.

(10) Patent No.: US 7,245,603 B1
(45) Date of Patent: Jul. 17, 2007

(54) MOBILE TELECOMMUNICATIONS NETWORK WITH DISTRIBUTED BASE STATIONS

(75) Inventors: Thierry Lucidarme, Montigny le Bretonneux (FR); Fabrice Robert, Montigny le Bretonneux (FR); Pierre Emmanuel Calmel, Paris (FR); Patrick LaGrange, Montrouge (FR); Christophe Bonnot, Bougival (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 968 days.

(21) Appl. No.: 10/088,753

(22) PCT Filed: Sep. 20, 2000

(86) PCT No.: PCT/IB00/01410

§ 371 (c)(1),
(2), (4) Date: Jun. 11, 2002

(87) PCT Pub. No.: WO01/22754

PCT Pub. Date: Mar. 29, 2001

(30) Foreign Application Priority Data

Sep. 20, 1999 (EP) .................................. 99402300

(51) Int. Cl.
*H04Q 7/24* (2006.01)
*H04L 12/28* (2006.01)
*H04L 12/56* (2006.01)
*H04J 3/17* (2006.01)

(52) U.S. Cl. ........................ 370/338; 370/401; 370/434

(58) Field of Classification Search ................. None
See application file for complete search history.

(56) References Cited

U.S. PATENT DOCUMENTS

| | | | | |
|---|---|---|---|---|
| 5,598,407 A | * | 1/1997 | Bud et al. .................... | 370/330 |
| 5,974,036 A | * | 10/1999 | Acharya et al. ............. | 370/331 |
| 6,097,704 A | * | 8/2000 | Jackson et al. ............. | 370/280 |
| 6,122,508 A | * | 9/2000 | Veloso ........................ | 455/433 |
| 6,483,825 B2 | * | 11/2002 | Seta ............................ | 370/335 |
| 6,975,632 B2 | * | 12/2005 | Deo et al. .................... | 370/401 |
| 7,020,475 B2 | * | 3/2006 | Bahl et al. ............... | 455/456.1 |

FOREIGN PATENT DOCUMENTS

| | | |
|---|---|---|
| EP | 0 766 427 A2 | 4/1997 |
| GB | 2 308 041 A | 6/1997 |
| GB | 2 320 647 A | 6/1998 |
| WO | WO 99/09769 A1 | 2/1999 |

* cited by examiner

*Primary Examiner*—Chi Pham
*Assistant Examiner*—Ronald Abelson
(74) *Attorney, Agent, or Firm*—Barnes & Thornburg, LLP

(57) ABSTRACT

A mobile telecommunications local area network (20) is described with a concentrator (32) connected to a plurality of radio heads (36, 38) via a local area network (LAN, 20). The concentrator (32) provides remote control of a local timing signal individually in each radio head. The control may be open loop or closed loop and may be provided through the LAN. The concentrator may also provide digital signal processing (DSP) as a shared resource for the radio heads (36, 38). The DSP may include channel coding. The radio heads (36, 38) may provide modulation for channel coded signals transmitted form the concentrator (32) via the LAN (20). The LAN may be wired LAN or a wireless LAN.

36 Claims, 17 Drawing Sheets

MOBILE TELECOMMUNICATIONS NETWORK WITH DISTRIBUTED BASE STATIONS

The present invention relates to distributed base stations for a local mobile telecommunications network and methods of operating the same as well as to local area networks and shared resources thereon which may be used to transport messages to and from base stations.

TECHNICAL BACKGROUND

Local area networks (LAN) have made a major impact on office environments in the last 20 years. Generally, two types of LAN have been offered commercially, the most common being Ethernet™ and the second most common token rings. Most LAN's have network elements coupled by wires or optical cables but there are LAN designs which use infra-red or radio interconnections (so-called Wireless LAN's).

LAN technology has reached a high level of sophistication, e.g. server-based LAN's, interconnections between LAN's to provide a wide-area service (WAN) and virtual LAN's which support different protocols, e.g. both Ethernet™ and Token Rings.

Up to now a LAN has been an additional component in any office, that is the LAN has been installed alongside existing telephone and power services, and has therefore been an additional expense. There is an on-going interest in making the office environment more efficient, e.g. by combining services together thus reducing infrastructure costs. Attempts of this kind include providing telephone services via a LAN, e.g. Voice-Over-IP or VoIP which provides telephone services at a LAN terminal via data networks and gateways to telephone networks, or attempts have been made to provide telephone and data services via power circuits.

A more fundamental simplification of the office environment is to do away with the traditional wire-line telephone system in the office and replace it by a cordless or wireless system (the so-called "Cordless Office" or "Wireless Office"). In the article "The wireless office" by Gordon J. Povey in Electronics & Communication Eng. Journal, vol. 8, no. 2, April 1996, the concept is described of providing cellular phones to employees for general use within an office building rather than the employees having conventional wire-line telephones. Low power base stations are used in the office and the cellular phones are said to be compatible with the main cellular network outside the building. This suggestion has been criticized in the article by W. H. W. Tuttlebee entitled "Cordless telephones and cellular radio: synergies of DECT and GSM", Electronics & Communication Eng. Journal, vol. 8, no. 5, October 1996, as being too expensive. It should be noted that providing wiring and installing all the equipment amounts to about 80% of the costs of a conventional indoor mobile phone network.

A system for providing base stations in an office environment is described in EP 766 427 in which a gateway between a mobile telecommunications system and a LAN is provided. Low-power base-stations are distributed around the LAN, i.e. within the office. the base stations and the gateway are designed to provide a radio interface between the low-power base stations and mobile terminals which is substantially identical with that provided by an "ordinary" base station in mobile telecommunications systems. By ordinary it is presumably meant that the radio interface is identical to that provided by base stations normally linked on the wire-line side to a hierarchical telecommunication system with dedicated communication links to the base stations.

This known system has certain disadvantages. In a GSM system, the LAN of the known system provides the GSM Abis interface, i.e. the interface between the BSC and the base station transceiver (BTS) and the wireline connection between the LAN gateway and the network MSC provides the A interface conventionally located between the mobile switching center (MSC) and the base station controller (BSC). For more explanation of the GSM system see, for example, the book by M. Mouly and M-B Pautet, "The GSM system for mobile communications", Cell & Cys, 1992. The gateway and base stations of '727 form a Base Station Sub-system (BSS) in which each base station controls a small coverage area or nanocell. The whole LAN is a location area within the GSM network, i.e. it corresponds to a significant element of the network despite only serving a limited number of mobiles. This means that the distributed base stations have at least full base station functionality. In fact they have more: they have dynamic channel allocation and a LAN interface. This increases the cost of the base station and places a load on frequency reuse and on the number of location area indicators in the network. The result is an expensive system which may have difficulty competing with alternative systems, e.g. a cordless telephone system despite the fact that such a system does not provide the same functionality, e.g. dual mode mobile stations would be required to provide access to both the cordless and wireless systems. The operation of a plurality of nanocells increases the difficulty of finding suitable frequencies for re-use throughout the system.

GB 2 308 041 describes a central control unit which communicates with radio head over a dedicated HDSL link. A synchronization pulse is sent to each radio head every hour by the control unit over the HDSL link. Accordingly, timing signals must be generated local to the radio head for its operation which are very accurate over time periods of one hour. This requires an accurate timing device in each radio head. There is no indication that such a control unit (e.g. providing synchronization signals or channel coding or decoding) would work effectively when the radio heads are used as a shared resource on a Local Area Network.

GB 2 320 647 describes a cellular radio communication system having a central cell control station which takes over some of the functions of a base station transceiver. The central control station has a Local Area Network which is connected via a router with a remote base station over a dedicated ISDN/ATM link. The base stations are distributed over a wide area which requires generation of timing signals for the base station locally to the base station rather than in the central control station due to the large and unpredictable delays over the long distances.

The use of a LAN in mobile networks is known from U.S. Pat. No. 5,475,689 which describes the use of a LAN between the mobile switching center (MSC) and the base station controller (BSC). However, in this system the base stations are conventional.

U.S. Pat. No. 5,187,806 describes apparatus for extending a cellular system. This system employs a dedicated (antenna to antenna) radio frequency connection between a master base station and a remote base station. Another system described in U.S. Pat. No. 5,809,422 uses a line-of-sight microwave or optical link, an optical or a coaxial cable. A further system is known from U.S. Pat. No. 5,657,374 which uses an optical cable (or other non-specified high bandwidth carrier) between centralized base stations and distributed antenna units.

Provision of mobile communications within a building may be looked upon as one case of provision of such services in inaccessible places. U.S. Pat. No. 5,603,080 and U.S. Pat. No. 4,718,108 deal with systems able to provide mobile telephone communications in an inaccessible place, e.g. underground. Both known systems use a cable connection to repeaters in the inaccessible region.

It is an object of the present invention to provide a network and a method of operating the same which provides mobile telecommunications services in inaccessible places and/or buildings at a reasonable cost.

SUMMARY OF THE INVENTION

The present invention may provide a first local mobile radio telecommunications network which is connectable to and compatible with a second mobile radio telecommunications network, the first local network comprising: a first and a second radio head for radio communication with one or more user terminals compatible with the second mobile radio telecommunications network; a concentrator connected to the radio heads by a local shared resource network, the radio heads being shared resources of the concentrator, synchronization and frequency of a local timing signal of each of the first and second radio heads being controlled individually and remotely. The control is preferably by the concentrator. The control by the concentrator is preferably through the local shared resources network. The control of the local timing directly from the concentrator avoids the need for an accurate local clock in each radio head. The control may be open loop, i.e. the concentrator sends a signal over the local shared resource network from which the local timing signal can be extracted, both frequency and synchronization. Synchronization may be described as the relative delay between two radio heads. For example, the concentrator may send messages to each radio head at a very accurate bit rate and at specific times in the form of a bit train from which each radio head may extract a local timing signal of known frequency and timing. Alternatively, the control may be closed loop. For example, the radio head has a voltage controlled oscillator (VCO) to generate a local timing signal. The concentrator sends a synchronization pulse over the local shared resource network from which the radio head determines the delay between the output of its VCO and the arrival time of the synchronization pulse. The value of this difference is sent back to the concentrator via the local shared resource network. On receipt of this value the concentrator determines a voltage change value, that is the voltage change at the VCO necessary to bring the head into synchronization and to the correct frequency. This voltage change value is then transmitted to the radio head via the local shared resource network and is used by the radio head to adjust the VCO. In determining the voltage change value, the concentrator may use a plurality of reported delay values from the respective radio head. The concentrator then calculates a suitable average or optimized value for the voltage change value. By this means jitter on the LAN as well as change in load on the LAN and temperature changes in the radio head may be compensated for by the concentrator.

The concentrator may include an accurate timing device or clock or may have a unit for generating timing signals from an external source. The timing signal may be generated from a signal received at the concentrator from the second network via a wireline or radio link or may be generated independently of the second network, e.g. from a Global Positioning System (GPS) or from a radio time beacon usually used for controlling the time of clocks and watches fitted with the necessary receivers. The control by the concentrator of local timing signals is of importance for the radio heads when the radio heads must transmit to and/or receive framed and slotted signals from the incumbent second network. In such cases it is important that each radio head operates at the "network time" of the second network.

The present invention may also provide a first local mobile radio telecommunications network which is connectable to and compatible with a second mobile radio telecommunications network, the first local network comprising: a plurality of radio heads for radio communication with one or more user terminals compatible with the second mobile radio telecommunications network; a concentrator connected to the radio heads by a local shared resource network, the radio heads being shared resources of the concentrator; and the concentrator including at least one digital signal processing unit, the digital signal processing unit being a shared resource for the radio heads.

"Digital signal processing" (DSP) in accordance with any embodiment of the present invention involves operations involving digital signals of a bit stream which represent some kind of symbols (e.g. speech or data symbols), in which the number of bits used to represent a symbol is altered (e.g. channel coding, most kinds of encryption, puncturing, compression, digital filtering) or the order of bits is altered (e.g. interleaving) or the bit stream is transformed (e.g. compression of over-sampled analog speech signals into digital signals, modulation, demodulation). DSP is not intended to mean adding or removing of header bits on packets of digital data signals. A digital signal processing unit may carry out, for instance, one or more of the following operations: channel coding (such as convolutional coding), channel decoding, modulation, demodulation, digital filtering, channel equalization, encryption, decryption, interleaving, de-interleaving, puncturing, de-puncturing, source coding (e.g. conversion of analog speech or data to digital signals) or source decoding. For example, the concentrator may include a demodulator for demodulating radio samples from the one or more radio heads. User messages are encoded by the mobile terminals for transmission of a radio interface to the radio heads. These user messages may be regained in the concentrator by the digital signal processing units. The concentrator may include a channel coder for channel coding the user messages and signaling information to be transmitted to the radio heads via the local shared resource network. The local shared resource network may be a LAN or a wireless LAN but may also include other forms of local networks such as a field bus or Controller Area Network (CAN). Each radio head may include a modulator for modulating signals to be transmitted from the particular radio head. The second mobile telecommunications network may be the same as the first. e.g. both are part of a cellular GSM system and the mobile terminals would the same for both networks. Alternatively, the second mobile telecommunications network may be different from the first, e.g. the second mobile telecommunications network may be a cellular GSM system and the first network operates using the UMTS standard developed by ETSI. In this case the mobile terminals would be dual mode terminals. As another example, the second mobile telecommunications network could be a cellular UMTS network using wideband CDMA (code division multiple access) and time division multiple access (TDMA) and frequency division whereas the first network is a UMTS network using CDMA and time division duplex (TDD) which is an alternative operating system of the UMTS standards designed for indoor applications.

The present invention also provides a method of operating a first local radio telecommunications network which is connected to and compatible with a second mobile radio telecommunications network, comprising the steps of: transmitting radio signals from a first and a second radio head to one or more user terminals compatible with the second mobile radio telecommunications network, a concentrator being connected to the local shared resource network, the concentrator and the radio heads being shared resources of a local shared resources network; and remotely controlling the frequency and synchronization of a local timing signal of each of the first and second radio heads individually. The control is preferably by the concentrator.

The present invention also provides a method of operating a first local radio telecommunications network which is connected to and compatible with a second mobile radio telecommunications network, comprising the steps of: receiving first radio telecommunication signals from one or more user terminals compatible with the second mobile radio telecommunications network at one or more radio heads, the first radio telecommunication signals encoding user messages; transmitting second radio signals derived from the first radio telecommunication signals over a local shared resource network to a concentrator; and digital signal processing the second radio signals in the concentrator. The digital signal processing may regain the user messages. Demodulation of the radio samples may be performed in the concentrator. Alternatively, channel coding of user and signaling/control messages may be performed in the concentrator.

The present invention may also provide a concentrator for connection on one side to a mobile radio telecommunications network and for connection on another side for use as a shared resource on a local shared resource network having a plurality of radio heads as shared network components; the concentrator comprising: an interface to the local shared resource network; and the concentrator being adapted to control remotely and individually for each radio head both synchronization and frequency of a local timing signal required for the operation of the radio heads. The remote control may be over the local shared resource network.

The present invention may also provide a concentrator for connection on one side to a mobile radio telecommunications network and for connection on another side for use as a shared resource on a local shared resource network; the concentrator comprising: an interface to the local shared resource network; a digital signal processing unit for digital signal processing at least user messages and/or signaling messages to generate outgoing radio signals and for transmitting these outgoing radio signals to the interface for transmission to a radio transmitter. The digital signal processing unit of the concentrator may be adapted for channel coding of user and/or control messages to be sent to the radio transmitter. The digital signal processing unit of the concentrator may be adapted for demodulating incoming radio samples received via the interface from a mobile radio terminal.

The present invention may also provide a first local radio telecommunications network which is connectable to and compatible with a second mobile radio telecommunications network, the first local network comprising: a plurality of radio heads for radio communication with one or more user terminals compatible with the second mobile radio telecommunications network; a concentrator connected to the radio heads by a local shared resource network, the radio heads being shared resources of the concentrator, and a scanning unit to scan transmissions from sources of radio energy, the scanning unit being a shared resource on the local shared resource network. For example, each radio head may include at least two fixed gain receiver amplifiers and a unit for selecting the output of one of the amplifiers or none of the outputs of the amplifiers.

The present invention may also provide a first local radio telecommunications network which is connectable to and compatible with a second mobile radio telecommunications network, the first local network comprising: a plurality of radio heads for radio communication with one or more user terminals compatible with the second mobile radio telecommunications network; a concentrator connected to the radio heads by a local shared resource network, the radio heads being shared resources of the concentrator and the concentrator being adapted to select one or a limited number of the radio signals from the plurality of radio signals from one user terminal for digital signal processing.

The present invention may also provide a first local radio telecommunications network which is connectable to and compatible with a second mobile radio telecommunications network, the first local network comprising: a plurality of radio heads for radio communication with two or more user terminals compatible with the second mobile radio telecommunications network; a concentrator connected to the radio heads by a local shared resource network, the radio heads being shared resources of the concentrator; the two or more radio heads being adapted to receive signals from a user terminal and the first network is adapted to select the signals from one of the radio heads for transmission over the local shared resource network.

The present invention may provide a radio head for connection on one side for use as a shared resource on a local shared resource network and on another side for communicating with user terminals of a radio telecommunications network via an air interface; the radio head comprising: an interface to the local shared resource network; a synchronizing unit for receiving signals from the local shared resource network for remote control of the synchronization and frequency of a local timing signal required for the operation of the radio head.

The present invention may provide a radio head for connection on one side for use as a shared resource on a local shared resource network and on another side for communicating with user terminals of a radio telecommunications network via an air interface; the radio head comprising: an interface to the local shared resource network; and a unit for transmitting to the interface non-demodulated radio signals received from the user terminals.

The present invention may provide a radio head for connection on one side for use as a shared resource on a local shared resource network and on another side for communicating with user terminals of a radio telecommunications network via an air interface; the radio head comprising: an interface to the local shared resource network; and a first unit for receiving channel coded radio signals from the interface; and a second unit for modulating the received channel coded signals.

The dependent claims define separate individual embodiments of the present invention. The present invention, its embodiments and advantages will be now be described with reference to the following drawings.

DESCRIPTION OF THE ILLUSTRATIVE EMBODIMENTS

The present invention will be described with reference to specific embodiments and with reference to specific drawings which are mere schematic, non-limiting representations and the invention is not limited thereto but only by the claims.

Figure 1A:
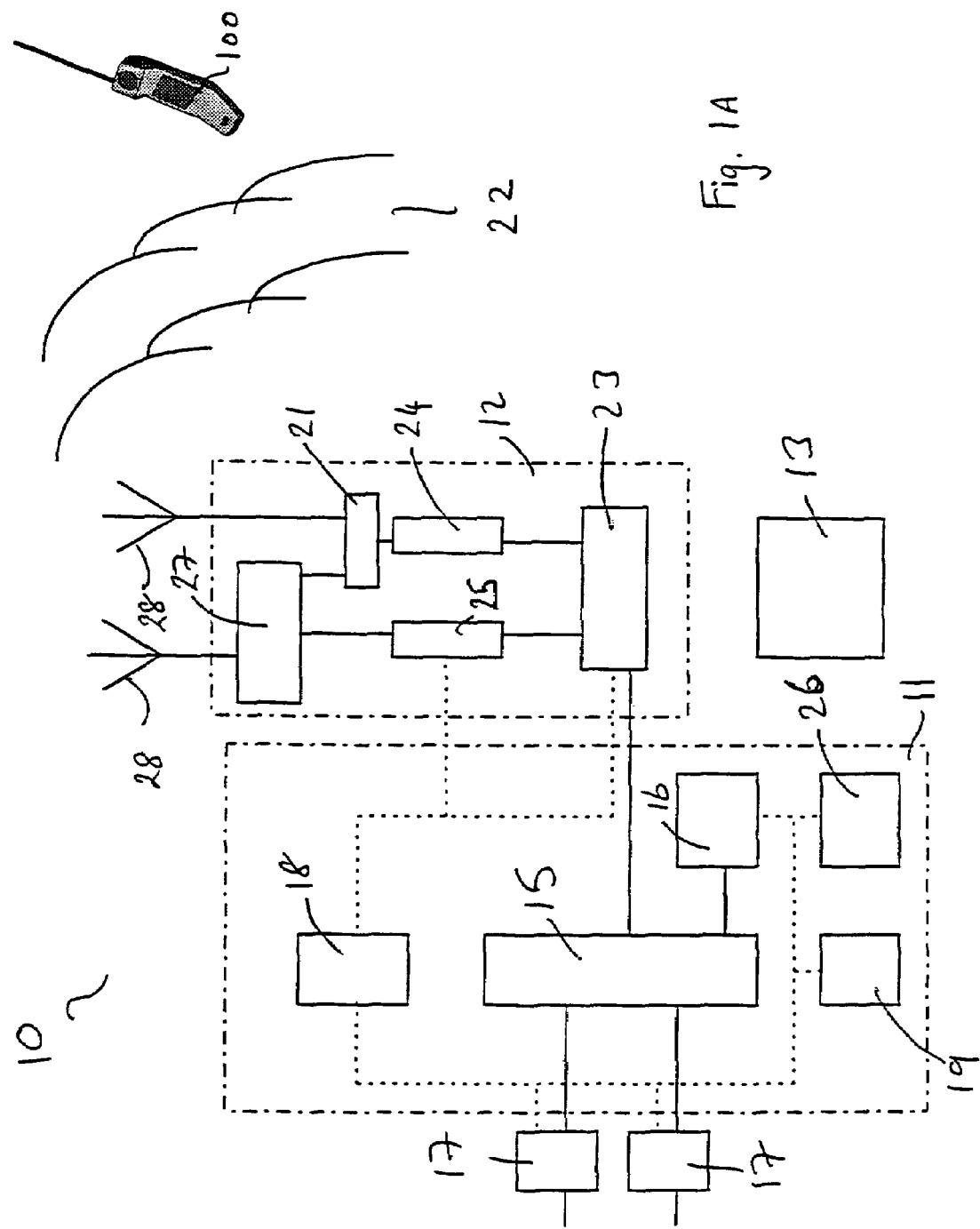
FIG. 1A is a schematic representation of a known indoor base station transceiver.

A known indoor base station transceiver (BTS, 10) is shown in FIG. 1A. BTS 10 is similar in architecture to S2000, S4000 or S8000 indoor BTS as supplied by Nortel Networks, Guyancourt, France. The BTS 10 includes a base common function unit (BCF) 11, a transmitter receiver unit (TRX) 12 and a power supply unit (PSU) 13. The BCF unit 11 includes a control & switch double board (CSW1 and CSW2) 15, 16 to manage the BTS 10, to configure and supervise the other modules in the BTS 10 as well as to control the BTS operations and maintenance requirements. The BCF 11 also includes an alarm circuit 26 and a signaling concentrator 19. The BCF 11 also provides through the synchronization unit 18 the necessary timing for all the modules in the BTS 10, e.g. the reference clock for TDM radio signals on the air interface 22. The BCF 11 also provides conversion of external signals from the BSC to internal signals and vice versa. The PCM interface (DTI) 17 provides control of the incoming signals from, and the outgoing signals to the BSC usually in the form of pulse code modulated (PCM) signaling. The BCF 11 also provides the necessary switching of the PCM slots, in particular, the multiplexing and demultiplexing of the signaling channels between the TRX 12 and the PCM slots.

The TRX 12 provides full duplex operation on the radio interface 22, e.g. transmission of signals via the transmitter 25 and transmission coupler 27, amplification of the received radio frequency signals from the air interface 22 via the transmission coupler 27 and receiver 24 and TDMA frame processing in the frame processing unit 23. Transmission coupler 27 may be a duplexer. Further, TRX 12 may include a second antenna for spatial diversity, the main antenna 28 and the second antenna 29 being connected to the receiver 24 via a splitter 21. Usually, there are several TRX 12 in any transceiver, first of all to provide redundancy and secondly so that at least one TRX broadcasts the beacon or pilot signal used by mobile units to locate the cell, to identify the BTS and make contact with it.

Figure 1B:
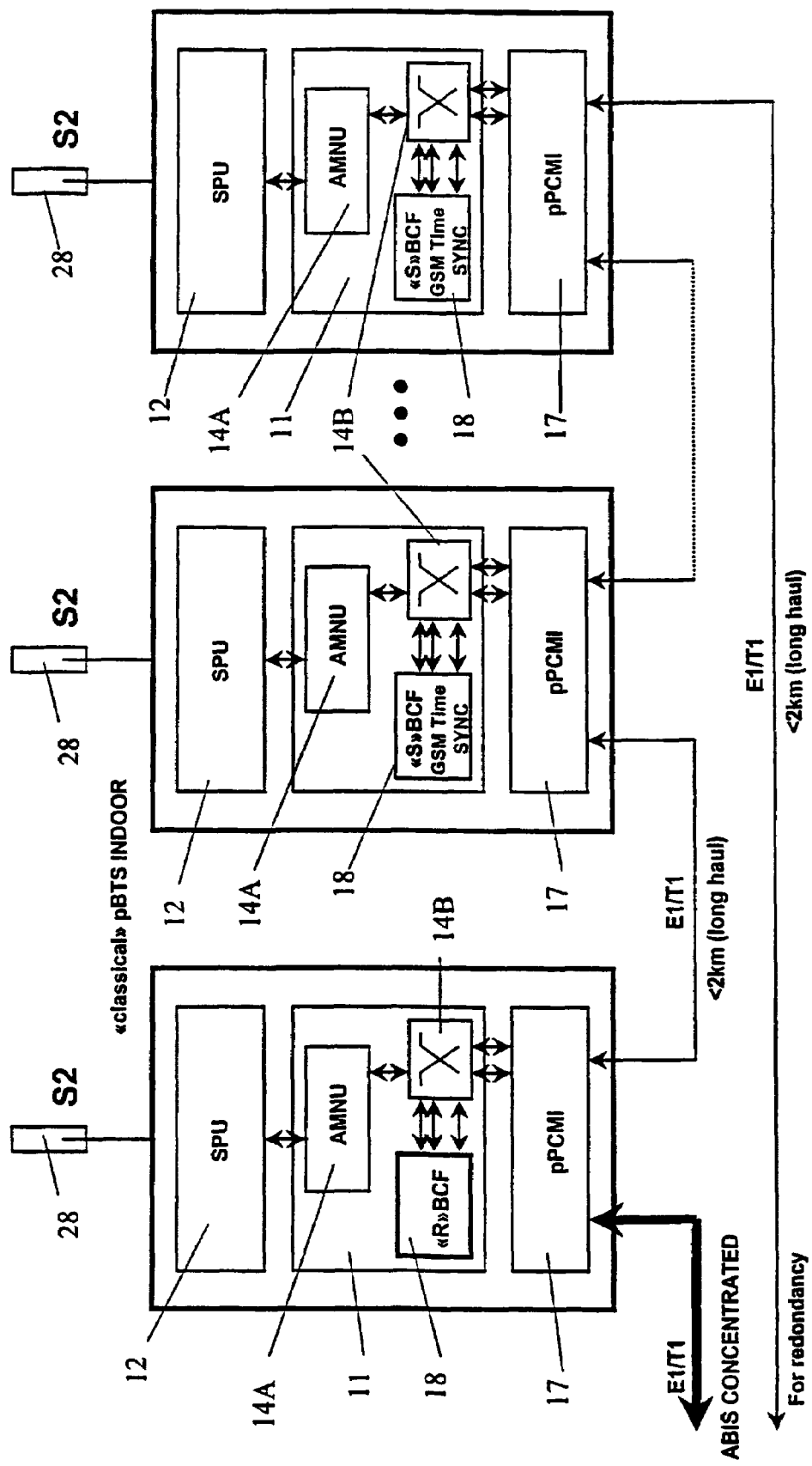
FIG. 1B is a schematic representation of a known "drop and insert" arrangement of base station transceivers.

The use of a plurality of BTS 10 in an office environment is shown schematically in FIG. 1B. As shown three BTS 10 are connected in a drop and insert manner via a PCM connection with a mobile telecommunications network. Each of the BTS 10 comprises a PCM interface 17, a BCF 11, a TRX 12 and an antenna 28. The BCF 11 may be conveniently described as comprising a synchronization time generator 18, e.g. from the signals from the PCM link 33, a switch 14A and a management unit 14B (which represent control and switch boards 15, 16 of FIG. 1A). This way of describing the BTS 10 emphasizes that the control and management of the BTS 10 is located in the BCF 10 whereas the main signal processing is carried out in the TRX 12.

Figure 2:
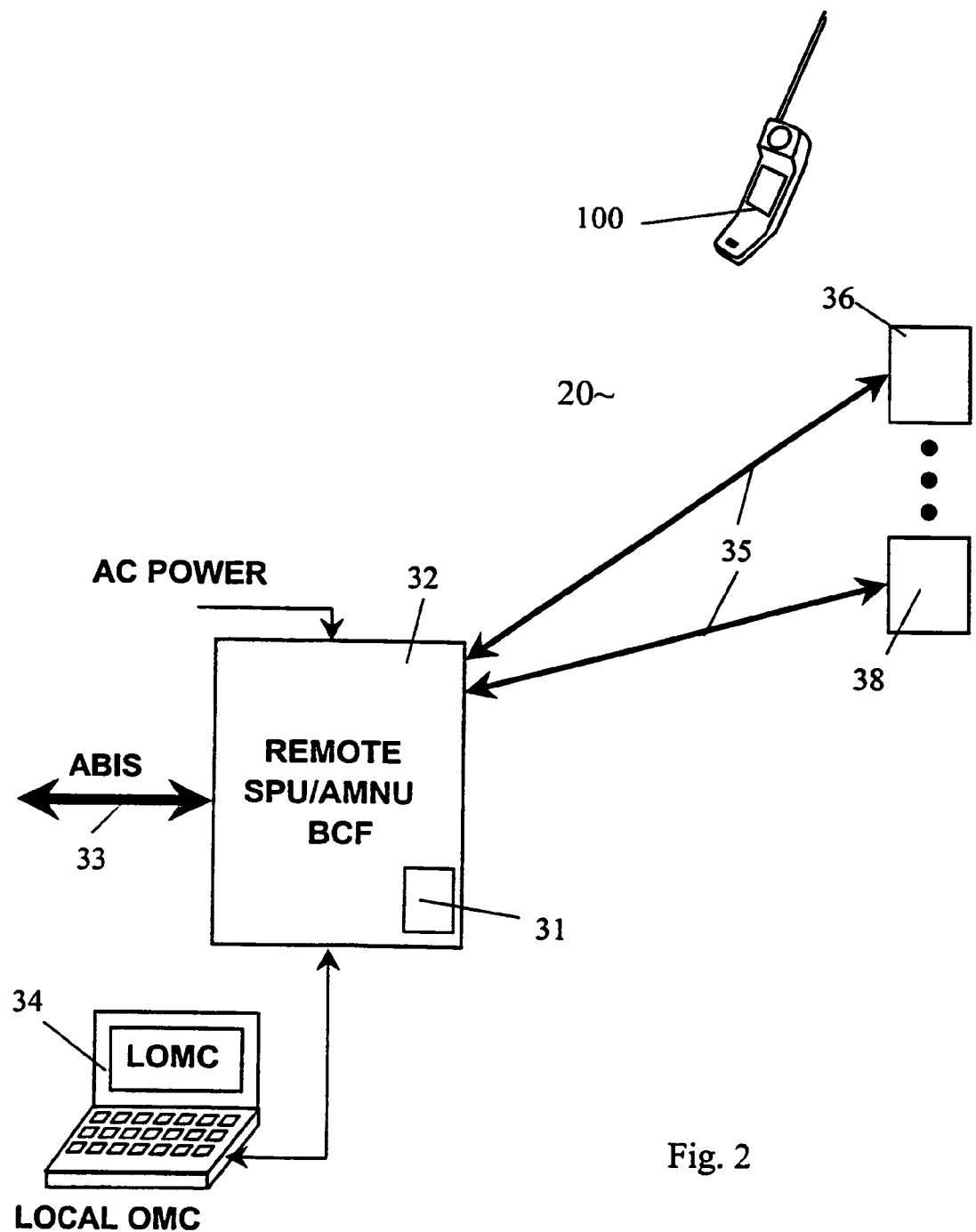
FIG. 2 is a schematic representation of a mobile telecommunications local network in accordance with an embodiment of the present invention.

The use of a plurality of the indoor BTS 10 in an office environment results in duplication of hardware and a service over capacity or under utilization of the resources. One aspect of the present invention is to provide a part of a mobile telecommunications network with more optimized use of hardware as shown schematically in FIG. 2. In this embodiment of the present invention a local mobile telecommunications network 20 is provided which includes a concentrator 32 which is connected to the rest of the mobile telecommunications network via a suitable connection 33, e.g. the connection 33 represents the Abis interface of a GSM mobile telecommunications system. The concentrator 32 controls the operation of a plurality of radio heads 36, 38 which provide the radio interface to mobile terminals 100. The concentrator 32 controls the synchronization and frequency of a local timing signal of each radio head individually. the local timing signal is required for the transmission operation of the radio heads 36, 38. The remote control of the radio heads is carried out over the connection 35. The concentrator 32 may have an accurate local clock for synchronization and frequency control of each radio head. Alternatively, the concentrator may use a timing signal received over the connection 33 from a mobile radio telecommunications network or may be generated locally from time signals received from a Global Position System receiver or other form of tiling signal transmitted by a radio connection. Hence, one aspect of the present invention is to synchronize remotely the operation of a plurality of radio heads operating within a cellular mobile radio telecommunications system over a remote network connection 35.

The concentrator 32 may also include some of the signal processing functionality which is thus a shared resource for the radio heads 36, 38 rather than being provided in each head 36, 38. The concentrator 32 may communicate with an operation and maintenance facility of the mobile telecommunications network via connection 33 and/or may include an optional local operation and maintenance console 34 (LOMC) which may carry out at least one operation and maintenance function such as frequency selection for radio heads 36, 38, or configuration of channels for the radio heads 36, 38. Another independent aspect of the present invention is that all alarm messages of all the radio heads 36, 38 are concentrated in concentrator 32. This allows reduction in the transmission of alarm messages to the incumbent network. Concentrator 32 may carry out diagnostic tests to determine the cause of certain types of alarms and can carry out certain types of corrective action without requiring transmission of such signals to the incumbent network under all circumstances.

Figure 3:
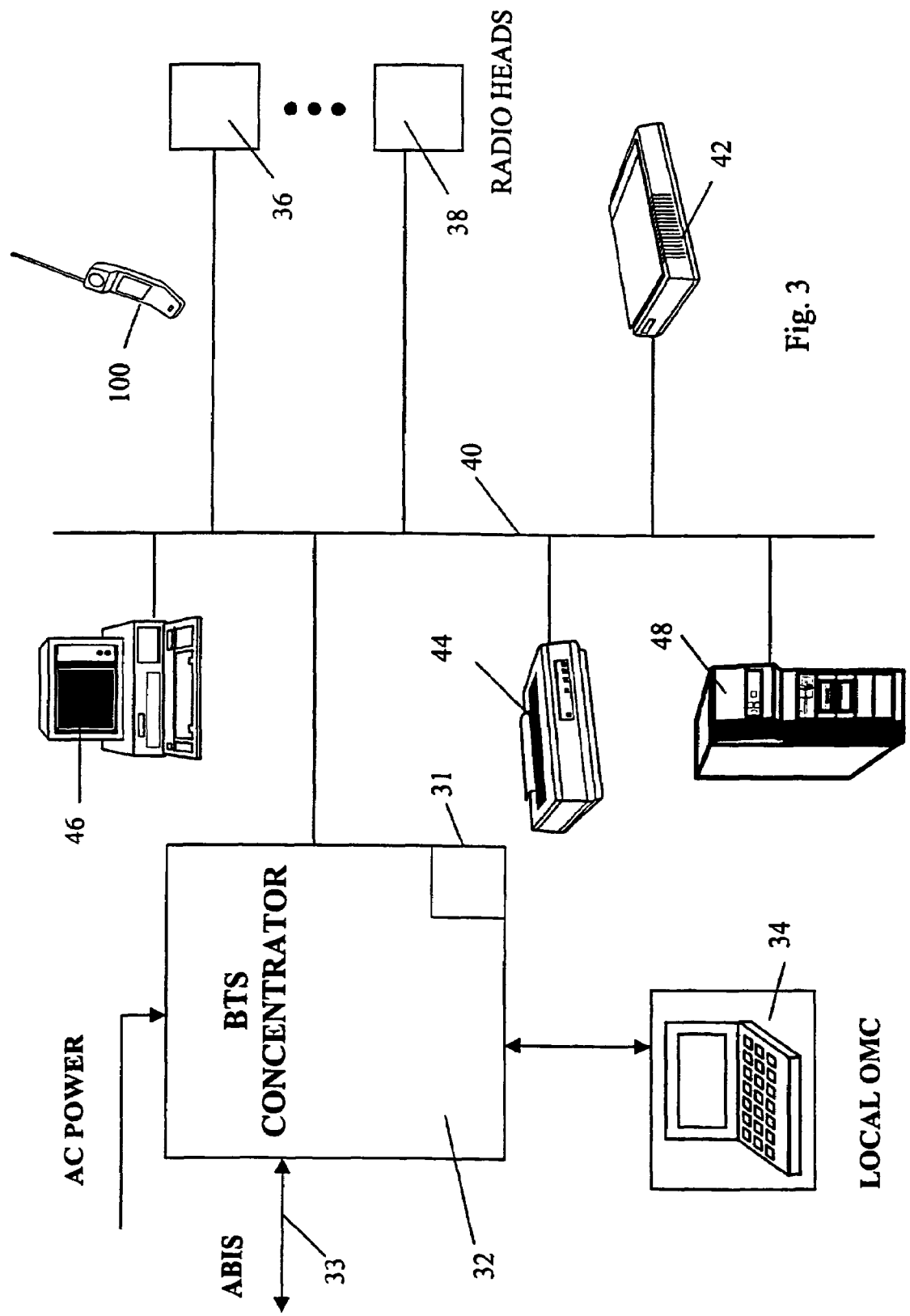
FIG. 3 is a schematic representation of a mobile telecommunications local network in accordance with another embodiment of the present invention.
Figure 4:
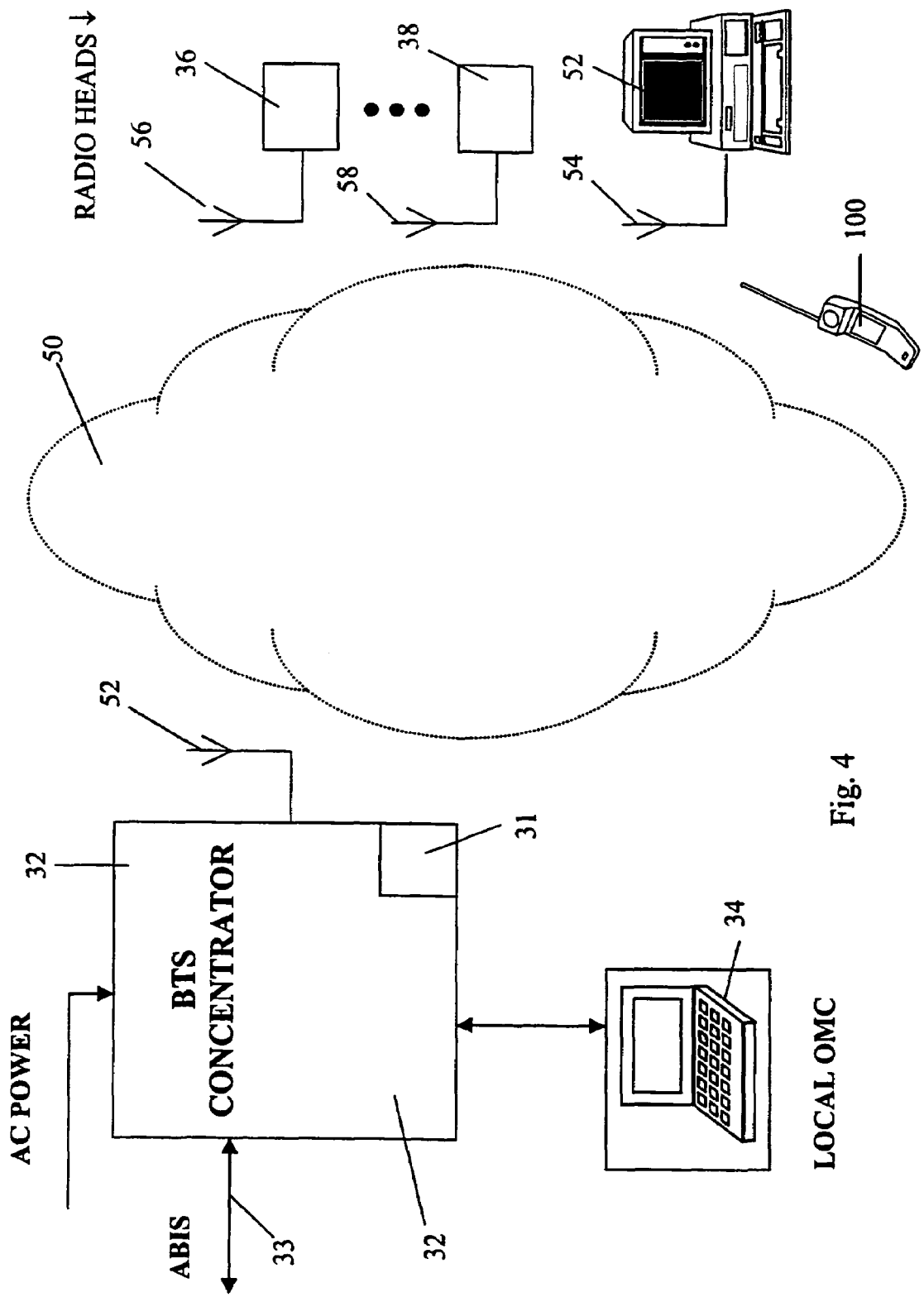
FIG. 4 is a schematic representation of a mobile telecommunications local network in accordance with yet another embodiment of the present invention.

The concentrator 32 is connected to radio heads 36, 38 by a communications link 35. One aspect of the present invention is to use a Share Resources Network (LSRN) for link 35. In an LSRN hardware resources are shared. An LSRN is typically a Local Area Network (LAN) 40 as shown schematically in FIG. 3. Radio heads 36, 38 are shared resources along with other network elements such as a scanner 42, printer 44, computer terminal 46 and server 48. AN LSRN in accordance with the present invention is more-or-less synonymous with a LAN, but the term LSRN will be used to indicate that the present invention is not limited to specific aspects of known LAN's e.g. contention method or whether Ethernet, Token Ring or Wireless LAN. For instance, as shown schematically in FIG. 4, the concentrator 32 may communicate with a plurality of radio heads 36, 38 via a radio communications system 50 such as a Wireless LAN, having the radio heads 36, 38 as shared resources as well as optionally other network elements such as a computer terminal 54. The concentrator 32 has an antenna 52 which is used to transmit messages to and from the antennae 56, 58 on radio heads 36, 38, respectively, as well as via antenna 54 to and from computer terminal 52. Ideally, non-line-of-sight communication methods are preferred.

The connection 33 to the concentrator 32 may be any suitable connection to the mobile telecommunications network, e.g. the first layer may be: a PCM, XDSL, cable modem, cable television link. The second layer may be ATM, HDLC, Internet Protocol (IP). The third layer may be any suitable protocol such as TCP/IP. The radio interface from the radio heads 36, 38 to the mobile terminals 100 is, in accordance with one embodiment of the present invention, preferably a standard radio interface as used in or compatible with the incumbent mobile telecommunications network outside the local network 20, 40, 50 and to which the local network 20, 40, 50 is connected. Preferably, the incumbent mobile telecommunications network is a cellular system, e.g. GSM, IS 95, third generation wide-band CDMA cellular system such as UMTS or CDMA 2000, or the EDGE draft standard being prepared by ETSI having an increased data rate over GSM through the use of 8-ary modulation. The radio heads 36, 38 may operate with the same radio air interface as the incumbent system or could operate in accordance with an alternative system. For instance the incumbent network may be cellular GSM and the radio heads 36, 38 have a UMTS air interface, or the incumbent system is a UMTS wideband CDMA network and the radio heads 36, 38 operate an air interface using the UMTS CDMA/TDD alternative mode. In accordance with a specific embodiment of the present invention the radio interface is a modified interface in accordance with co-pending European Patent Application No. 914 013 in which the beacon or pilot signal energy is reduced to thereby reduce the radio power transmitted from radio heads 36, 38 and to thereby reduce interference with other users.

Figure 5:
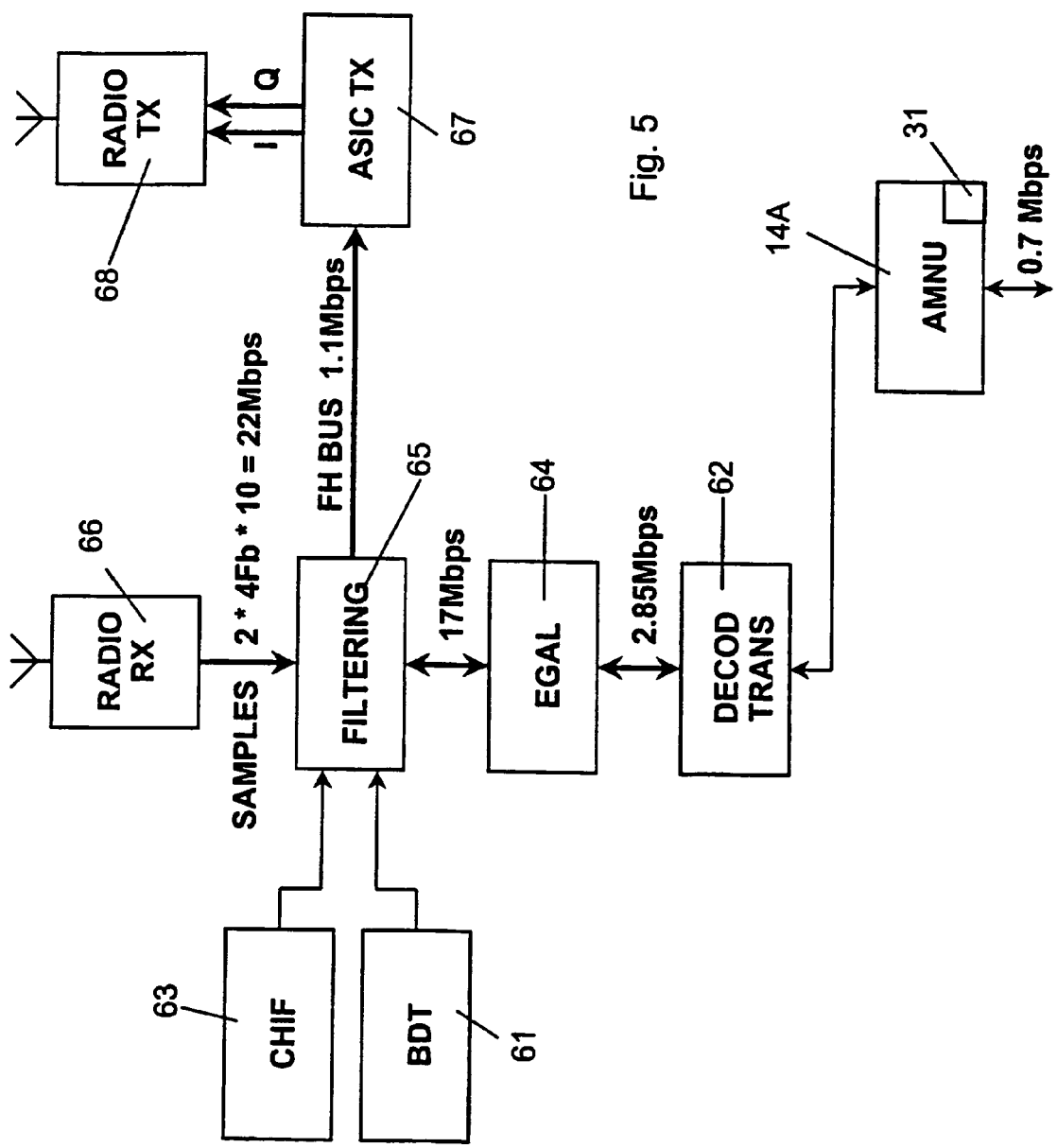
FIG. 5 is a schematic representation of the digital signal path in a base station transceiver.

As indicated above one aspect of the present invention is to concentrate certain parts of a base station transceiver into the concentrator 32 in order to reduce the total amount of hardware used to provide a certain local, e.g. indoor, service. Reduction in radio head hardware may be paid, however, with a price. As more of the signal processing units are located in concentrator 32, there is an increase in the bit rate which must be carried by the LSRN 20, 40, 50. An example of the bit rate required is shown in FIG. 5 for a GSM cellular mobile telecommunications system operating in accordance with the draft ETSI standard "EDGE" which is basically a GSM system utilizing 8-ary PSK modulation. In this known system each frame has eight time slots. In an indoor environment, each radio head 36, 38 does not need to have the full capability of communication channels usually available in a conventional base station transceiver. For example, two communication channels per radio head may be sufficient to provide communications to mobile telephones local to the radio head. In the following, the possibility of partitioning specific digital signal processing elements of a GSM/EDGE base station between the concentrator 32 and a radio head 36–38 will be described with reference to FIG. 5. Each of these respective partitioning schemes represents an individual embodiment of the present invention.

Let us assume that the all the signal processing of TRX 12 except the management unit 14A of the BTS 10 of FIG. 1B is placed in each radio head 36, 38. The remaining parts of the BCF 11 and the PCM interface 17 are located in the concentrator 32 as a shared resource for radio heads. In particular, a circuit 31 for the individual remote control of a local timing signal used in the operation of the radio heads 36, 38 is carried out in the management unit 14A of the concentrator 32. The control by the concentrator 32 is over the LSRN 20, 40, 50 to the radio heads 36, 38. Then the LSRN 20, 40, 50 must handle a bit rate of 0.7 MBs for each radio head 36–38.

If the management unit 14A and, in addition, a decoder and transcoder unit 62 is located in the concentrator 32 as a shared resource for radio heads, the LSRN 20, 40, 50 must handle 2.85 MBps. The decoder and transcoder unit 62 typically deals with channel coding, rate adaption, burst processing and channel decoding. It may also include signal processing units to translate A—or μ law coded signals on connection 33 to mobile telephone compressed signals ready for the radio interface to the mobile terminals 100 (and vice versa).

If the equalization unit 64 is also included in the concentrator 32 as a shared resource for radio heads, the LSRN 20, 40, 50 must handle 17 MBs. The equalization unit 64 is responsible for adapting the signals to the radio channel and for eliminating the distortion effects caused by multiple path reception.

An even higher bit-rate of 22 MBps or 26 MBps is required if the input and output to/from the radio receiver 66 or transmitter 68 is carried over the LSRN 20, 40, 50. The demodulation of the received signals is then performed by a demodulation unit in the concentrator 32 as a shared resource for the radio heads. A modulator unit 67 may be optionally provided in the radio heads 36–38 to perform modulation, e.g. Binary Phase-Shift keying (BPSK), Quadrature Phase-Shift keying (QPSK), Gaussian Phase-Shift keying (GMSK), Quadrature Amplitude Modulation (QAM)), 8-ary PSK, Differential Phase-Shift keying (DPSK), before the transmitter unit 68 transmits the modulated signal over the radio interface as well as performing transmission power management The concentrator 32 includes at least one signal processing unit as a shared resource for radio heads to carry out the filtering function of unit 65 which includes ciphering and deciphering (with the help of a ciphering unit 63) and providing the GSM/EDGE timing (unit 61) for synchronization purposes as well as all the equalization (64), decode/transcode (62) and management (14A) functions.

It will be understood that moving through the embodiments mentioned above progressively reduces the hardware cost in the radio heads (as more and more functions are placed in the concentrator 32 as shared resources), but increases the bit rate requirements on the LSRN. As higher bit rates generally cost more, there is usually an optimum trade-off on total system cost with a specific partitioning of functions between concentrator 32 and radio heads 36–38 which reduces the redundant use of hardware in the radio heads 36–38 while not increasing the bit rate on the LSRN 20, 40, 50 too much.

In the above embodiments, if more communication channels are to be available to each radio head 36, 38 the bit rates increase accordingly. In accordance with each of the above embodiments of the present invention, specific types of LSRN may find advantageous use. One aspect of voice transmission is that significant transmission delays or even worse significantly varying delays are considered to be unacceptable for high grade transmissions. Hence, one aspect which has to be considered in design of the LSRN 20, 40, 50 in accordance with the present invention or considered when a system in accordance with the present invention is installed on an existing LAN, is that the transmission delay is kept within acceptable limits. This may be done by selection of specific types of LSRN, e.g. by selecting deterministic LAN's such as Token Ring or circuit switched Ethernet with which the maximum delay time at any traffic density can be determined, and/or in the dimensioning of the LAN in such a way that delay times are kept within acceptable levels and/or in carrying out delay control from the concentrator 32 which allows for changes in load (described later).

Table 1 gives a non-limiting list of LAN types and the bit rates they can normally handle. LAN design and construction are discussed in detail in, for example, "Mastering Local Area Networks", by Christa Anderson and Mark Minasi, SYBEX Network Press, 1999. Various standards cover the above LAN's, e.g. IEEE 802.3, IEEE 802.4, IEEE 802.5, ANSI X3T9.5 (FDDI, I and II). The topology of the LAN is not considered a limit on the present invention, e.g. bus physical, star physical, distributed star, ring physical, bus logical, ring logical may all be used as appropriate.

TABLE 1

| Connection type | Protocol | Bit rate MBps |
|---|---|---|
| shielded twisted pair | PCM E1/T1 | <2 |
| twisted pair | xDSL | <8 |
| twisted pair (category 5) | ETHERNET | <10 |
| coaxial | " | " |
| optical fiber | " | " |
| twisted pair (category 5) | FETHERNET | <100 |
| coaxial | " | " |

TABLE 1-continued

| Connection type | Protocol | Bit rate MBps |
|---|---|---|
| optical fiber | " | " |
| coaxial | HOTLINK (CYPRESS) | 330 |
| optical fiber | " | " |

TABLE 2

| Wireless LAN type | Bit rate MBps |
|---|---|
| DECT | <0.8 |
| Blue Tooth | <1 |
| HIPERLAN | <22 |
| IEEE 802.11 | <2 |
| IEEE 802.11HR (Spread Spectrum) | <11 |
| Diffuse infra- red | <1 |

The present invention also includes the use of a wireless LSRN. A non-limiting list is given in Table 2. The design and construction of Wireless LAN's is discussed in detail in, for example, "Wireless Lan's" by Jim Geier, Macmillan Technical Publishing, 1999. Information on Blue Tooth can be obtained from the internet address http://www.bluetooth.com. Note that the use of DECT is as a transport for the digital signals transmitted from the concentrator 32. It is not intended that the voice signals of the cellular mobile telecommunications system are translated into DECT cordless phone format as if they were to be supplied to a DECT cordless telephone. Instead, the signals are transported transparently by the DECT wireless LAN network.

Figure 6:
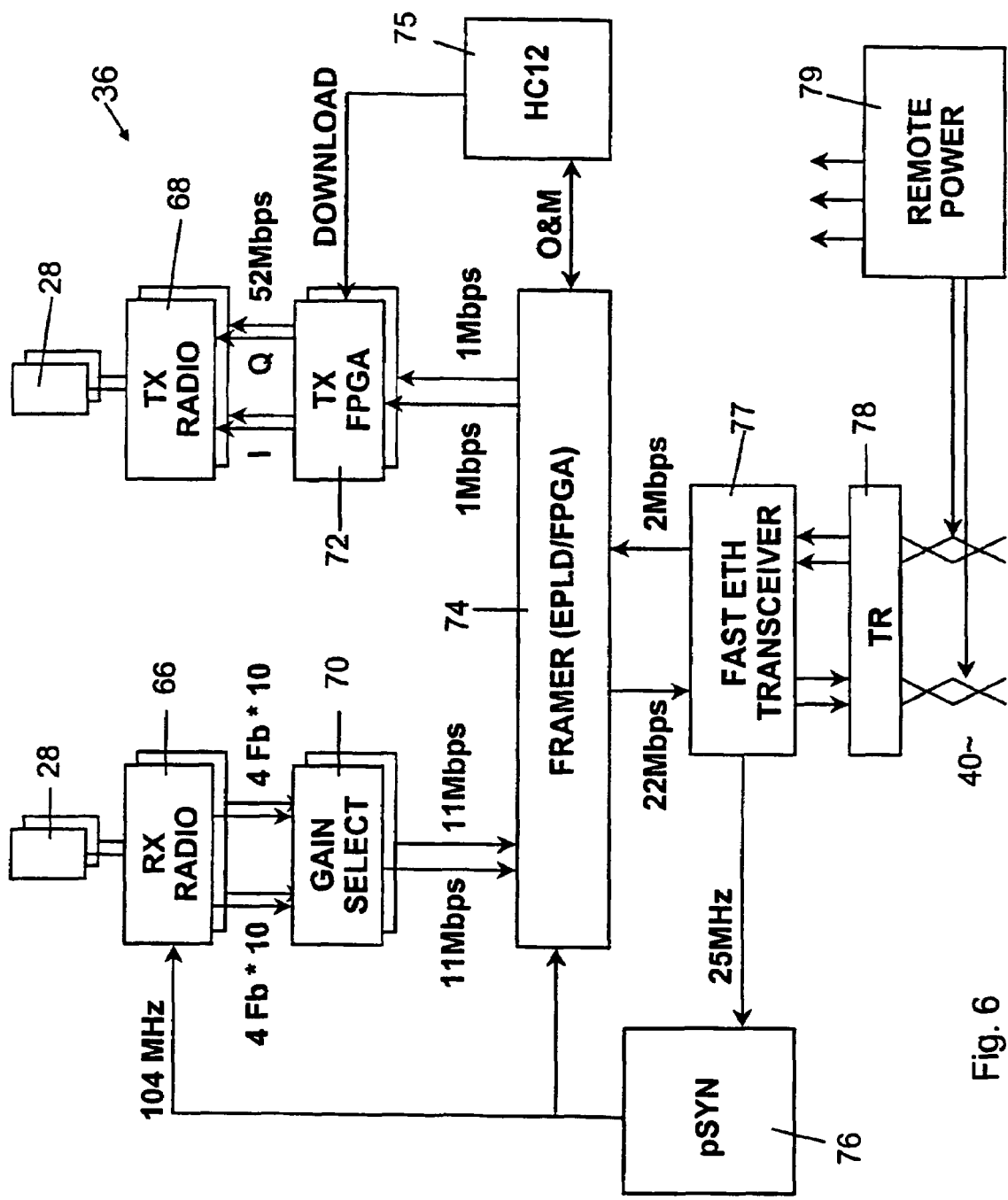
FIG. 6 is a schematic representation of a mobile telecommunications radio head in accordance with an embodiment of the present invention.
Figure 7:
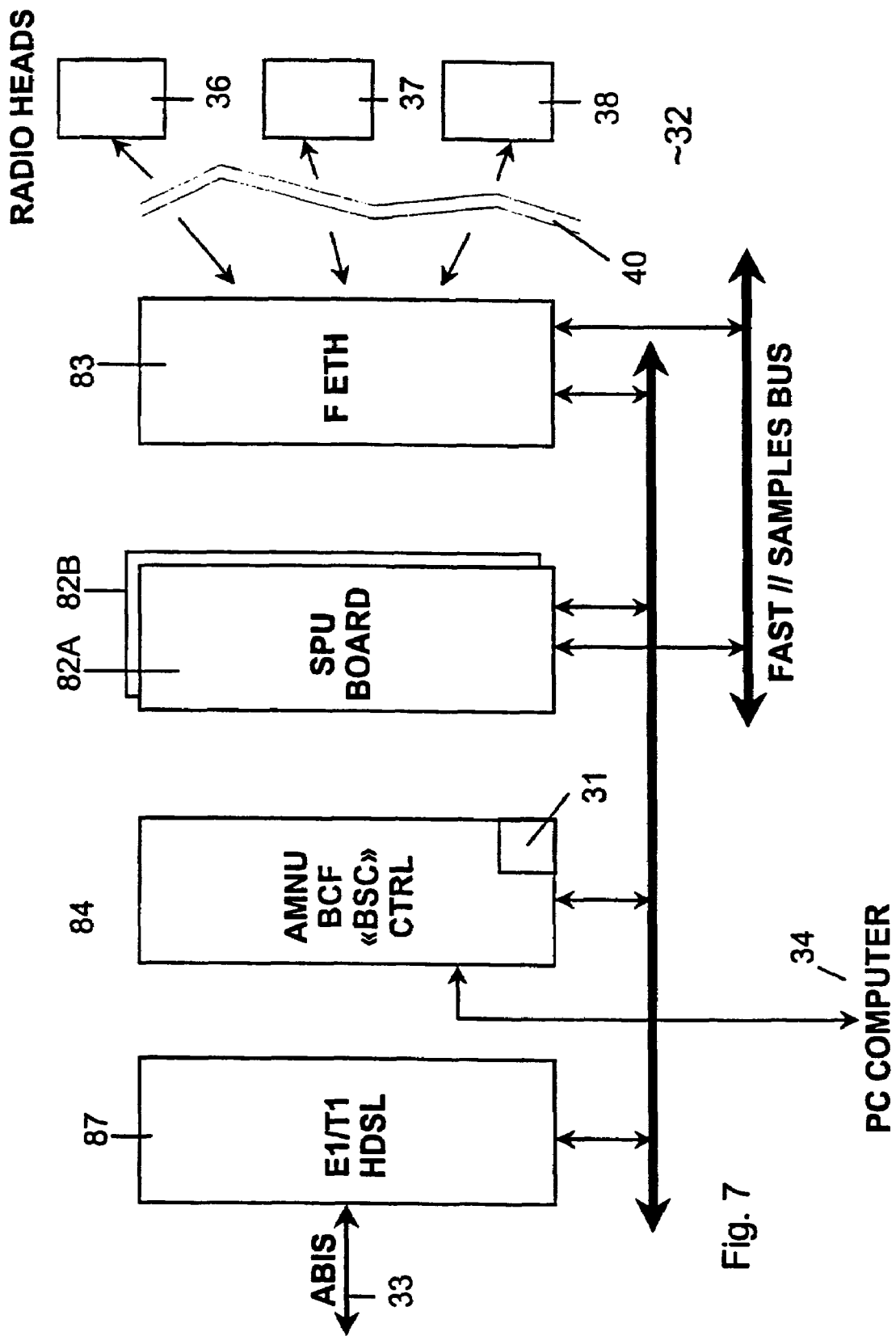
FIG. 7 is a schematic representation of a mobile telecommunications concentrator in accordance with an embodiment of the present invention.

A specific embodiment of the present invention will now be described in detail with reference to FIGS. 6 to 9. FIG. 6 is a schematic diagram of a radio head 36 in accordance with this embodiment. It is designed for two TDMA channels, i.e. 8×2=16 time slots of the GSM/EDGE eight slot frame may be processed by this radio head. FIG. 7 is a schematic representation of a concentrator 32 in accordance with this embodiment of the present invention which may be used with a GSM/EDGE cellular telecommunications system. Concentrator 32 receives and transmits signals to a plurality of radio heads 36–38 via an LSRN 40

The concentrator 32 includes a LAN interface 83 with appropriate software communication drivers. In the present case the LSRN 40 is a Fast Ethernet LAN with a maximum bit rate of 100 MBps. The interface 83 encapsulates the digital data to be sent to the radio heads 36–38 via LAN 40, providing the necessary framing, rate adaption, headers local network address of the appropriate radio head 36–38 and contention control. The input from the GSM network is provided via connection 33 on the Abis interface (BSC-BTS interface). In accordance with embodiments of the present invention the concentrator 32 may appear as a single base station in the GSM/EDGE system or, for example, as a tri-sector base station. A suitable interface 87 is provided with the appropriate software communication drivers to receive and transmit signals on the Abis interface. For instance, interface 87 may be an HDSL, E1/T1 interface when the respective transmission system is used.

In addition, control and management functions are provided by unit 84 which provides the control and management functions for the concentrator 32 and the radio heads 36 to 38. In particular unit 84 may include the timing signal generator 31. Control unit 84 may be coupled to a local Operations and Maintenance Control (LOMC), e.g. a PC 34. The LOMC PC 34 may provide any one or all of the following functions:

a) local frequency selection—OMC provides a list of candidate cellular frequencies and LOMC selects the most suitable from the list;

b) monitoring of degradation of transmission quality and changing frequency selection as necessary;

c) tuning of radio head static power step within limits set by system OMC;

d) tuning of the individual delay of each radio head. Default delay is zero but the LOMC can adjust each delay individually to obtain transmit time diversity, this diversity may be used to prevent standing waves/interference between simulcast transmissions from the radio heads; individual delays may be adjusted through the concentrator 32;

e) dynamic coverage configuration, i.e. the LOMC may select which traffic channels and time slots are made available to each radio head at any time.

In addition, in accordance with some embodiments, one or more signal processing units 82A, 82B may be provided for processing the signals to and from the radio heads 36–38 (described in more detail later). Timing signals on the incoming bit stream are processed by the unit 84 and timing signals or control signals from circuit 31 are transferred to the radio heads via LSRN 40.

The radio head 36 of FIG. 6 includes a receiver 66 for receiving GSM radio communications from user terminals 100 in range of the receiver 66. The receiver 66 transmits the quadrature phase modulated I and Q signals to a frame processor 74. As two TDMA channels may be used by each radio head and there are two receivers 66 in each radio head, the bit rate supplied by the receiver to the frame processor 74 is 22 MBps. Optionally, bit rate on the LSRN may be reduced by a compression unit 70 and thus avoiding traffic congestion and excessive delays. Typically, automatic gain control is not used on radio signals received from the radio receiver 66. Instead, a plurality of fixed gain amplifiers of different gains are used in parallel. The unit 70 selects only one preferred output of the gain amplifiers, e.g. the one having an adequate signal level while not exhibiting indications of distortion caused by saturation of the amplifier. By selecting only one output the bit rate delivered to the LSRN is reduced in accordance with how many fixed gain amplifiers are used in parallel (usually two). The unit 70 in a further embodiment of the present invention is a limited diversity transmission unit (LDTU). The purpose of this unit is to select no output of the receiver amplifiers of certain of the radio receivers 66 in cases when radio signals are received by a plurality of the radio heads 36–38. As will be explained later a communication channel may be shared by several radio heads 36–38. This means that several radio heads 36–38 may receive the same signals from one transmitting mobile terminal 100. In some embodiments of the present invention this may be used to advantage as the combination of several different signals received by different radio heads 36–38 may be combined to provide improved reception quality from the spatial diversity. However, reception from an excessive number of radio heads can increase the traffic on the LSRN without providing any further gain in reception quality. In such a case the network 20 may instruct one or more of the LDTU's 70 to stop all transmission of the relevant received signals to the LSRN, leaving say two receivers which deliver signals of good quality to the LSRN for combining in the concentrator 32. Typically, the control of the limited diversity transmission operation will be performed by the LOMC 34.

Timing for the frame processor 74 and receiver 66 is supplied from a synchronization unit 76. In accordance with one embodiment the unit 76 extracts the GSM/EDGE network timing signal transported transparently through LAN 40 from the circuit 31 in the concentrator 32. The local timing signal generated in unit 76 may be derived from a bit stream sent by concentrator in an open loop control mode. For example, the concentrator may use an accurate internal timing signal to generate and then transmit a very accurate bit rate to each radio head at a specific frequency and timing or delay with respect to other radio heads. As shown this bit stream has a fundamental frequency of 25 Mhz. From the extracted signals, the unit 76 may generate other accurate frequencies such as 104 Mhz for driving the transmitter. The concentrator 32 controls the frequency of this local timing signal in each head by the frequency of the bit stream. Synchronization of each radio head is provided by the exact timing that a bit of the bit stream arrives at each radio head.

Alternatively, the control may be a closed loop. For example, each radio head includes a voltage controlled crystal oscillator (VCXO) in unit 76. This VCXO is set to operate within a frequency band. The VCXO is controlled remotely from the concentrator 32 so as to set the frequency of operation of the VCXO and the delay on its output. To achieve this the concentrator sends a synchronization pulse at regular intervals, e.g. every 577 microseconds down the LAN 40. The relevant radio head extracts these synchronization signals and compares the arrival time with pulses at the output of the VCXO using a comparator. The delay measured by the comparator is reported to the concentrator 32 over LAN 40 at the same frequency, i.e. every 577 microseconds. The concentrator compares the reported delay with a predetermined delay for that head, and in response to any difference between these two, sends a voltage change value to the relevant radio head over LAN 40. On receipt of this voltage change value the relevant head adjusts the voltage on the VCXO. By this procedure each radio head is rapidly tuned to a specified frequency and delay (synchronization) remotely from the concentrator.

In a further embodiment of the present invention the above procedure is modified to compensate for LAN jitter and/or LAN delay variation caused by load changes. In this embodiment the concentrator 32 uses a plurality of received delay values from a radio head to determine an average or optimum voltage change value to send to the relevant radio head. For example, the concentrator 32 may keep a rolling average of the reported delays in order to smooth out LAN jitter. Also, load changes on the LAN may cause variations in signal arrival times at individual radio heads. By fast closed loop delay control as described above, the concentrator adapts the delay of signals sent to each radio head to compensate for circuit delay. The rate of sampling and control of the control system of the concentrator is preferably fast, that is at least fast enough to compensate for temperature drift of the VCXO and more preferably fast enough to compensate for load changes on the LAN. The frequency of control signals is preferably 5 seconds or less, more preferably less than 1 second. Typically, the rate of control signals will be as fast as 1 hundredth of the frame rate or faster when the radio signals transmitted from the radio heads are organized as a number of time slots in a frame.

In an alternative embodiment the concentrator controls a local timing signal of the radio heads by other means, e.g.

via a separate network or via a separate radio link. The concentrator may be connected to an antenna for remote radio synchronisation and frequency control of the radio heads. Alternatively, the radio heads may be controlled by a radio signal from another source which is able to control both frequency and delay of the local timing signal in each radio head individually.

Frame processor 74 prepares the radio signal received by receiver 66 for placement on the LAN 40 via LAN interface and impedance transformer 77, 78, respectively. In accordance with one embodiment of the present invention these signals are still be in the quadrature phase modulated form and the demodulation of the received signal is carried out in the concentrator 32. This provides significant advantages. Firstly, the signal processing circuits are not duplicated in each radio head 36–38. The digital signal processing units in the concentrator 32 are a shared resource for the radio heads 36–38 thus providing economy of hardware. Secondly, location of the demodulation of the signals from all the radio heads in the concentrator 32 allows combining techniques to be applied to improve transmission quality (see later). The frame processor 74 may be implemented, for example, as an electrically programmable logic device or a field programmable gate array. LAN interface 77, 78 encapsulates the signals from receiver 66 in the LAN frame/packet format and provides the necessary rate adaption, headers and contention control as well as the network address of the concentrator 32 within LAN 40.

On the transmission side, the LAN interface 77, 78 extracts the encoded GSM user messages and signals from the LAN 40 which have been sent by the concentrator 32 and supplies these to the frame processor 74. Here the user messages are multiplexed into the GSM frame format ready for transmission to mobile terminals 100. The output from the frame processor 74 is supplied to the modulator 72 which provides the quadrature phase modulated I and Q signals to the transmitter 68 where they are upconverted and transmitted from antenna 28. Optionally, software updates may be downloaded to the modulator 72 from the OMC system via a suitable microcontroller 75 e.g. a 68HC 12 microcontroller supplied by Motorola, USA. The modulator may be implemented as a field programmable gate array.

Optionally, power for the radio head 36 may be provided via the LAN 40 from a remote power source 79 thus avoiding additional power wiring to radio heads 36–38.

Figure 8:
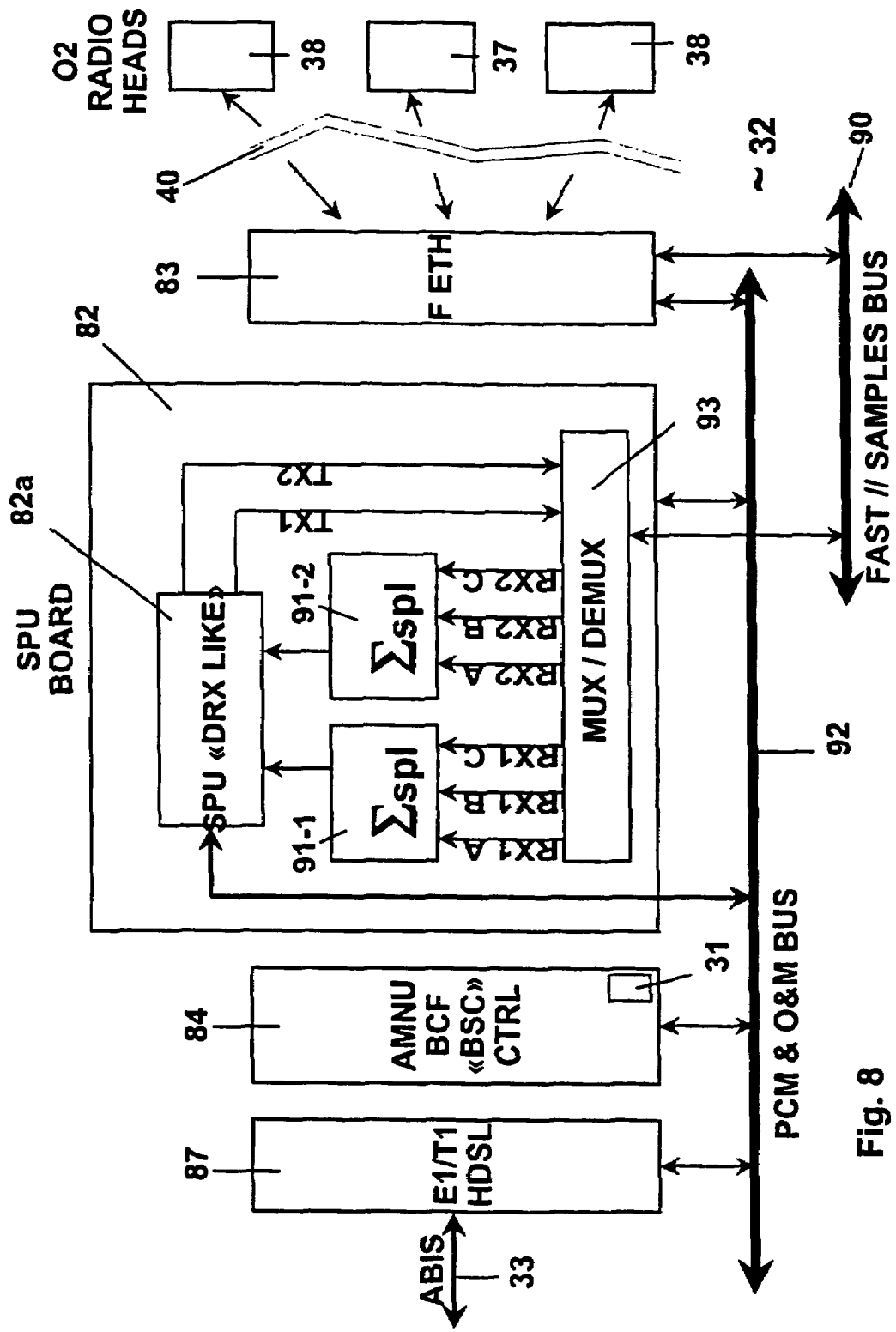
FIG. 8 is a schematic representation of a mobile telecommunications concentrator in accordance with another embodiment of the present invention.

Certain aspects of the concentrator 32 will now be described with reference to FIGS. 7, 8 and 9. As explained above the signal processing of signals to be transmitted from the radio head 36 to a mobile terminal 100 and of signals received from the mobile terminal 100 may be carried out differently in the concentrator 32 and the radio heads 36–38. In the case of signals received from mobile terminals 100 the demodulation may be performed in the concentrator 32. Other operations which may be performed in the concentrator 32 on received signals may be (depending on the system, the list relates to GSM) one or more of: deciphering; burst unformatting; de-interleaving and channel decoding. In the case of signals to be transmitted to mobile terminals 100 via radio heads 36–38 the modulation may be performed in the radio head 36–38. In the concentrator 32 one or more of the following operations are performed as shared resources of the radio heads (again system dependent—the list relates to GSM): generation of timing and/or synchronization signals for remote control of the radio heads; generation of control signals for remote control of a local timing signal of the radio heads; channel coding; interleaving; burst formatting and ciphering. In other mobile telephone systems such as those defined by the standard IS-95 or the UMTS standards being developed by ETSI, the signal processing steps may vary from those described above. However, it is general to mobile telecommunications systems that on the transmission side the signals are channel coded before transmission. Similarly, it is general to mobile telecommunications systems that on the reception side the signals are demodulated after reception. In accordance with separate and distinct but combinable embodiments of the present invention, the concentrator 32 may include a digital signal processing unit which demodulates received radio signals, alternatively or additional channel codes signals to be transmitted.

In accordance with embodiments of the present invention there is no restriction on which kind of mobile communications system is used nor what kind of demodulation system and/or channel coding system is used. The various functions may be partitioned differently between concentrator 32 and radio heads 36–38, for instance, the demodulation of the incoming signals from mobile terminals 100 received via the LSRN may be carried out in the concentrator 32 whereas the modulation of outgoing signals from the radio heads 36–38 to the mobile terminals 100 is preferably carried out in the radio heads.

In accordance with embodiments of the present invention the concentrator 32 acts as a gateway to the incumbent mobile telecommunications system, e.g. a public GSM cellular system. In addition, the concentrator 32 provides individual control of synchronization and frequency of a local timing signal used in the operation of a plurality of remote radio heads, the remote control of the radio heads being through the shared resource network. In addition or alternatively, the concentrator 32 may provide at least one digital signal processing unit as a shared resource for digital signal processing of radio signals for channel coding user messages received from the incumbent mobile telecommunications network and for transmission of these encoded signals over the LSRN to the radio heads 36–38. The concentrator 32 may also be configured for regaining the user messages which have been encoded by the mobile terminals 100. The digital signal processing units in the concentrator 32 are provided as a shared resource for the radio heads 36–38.

In particular, when a wireless LAN is used for the LSRN 20, 40, 50 the bit rate capacity of the wireless LAN may be insufficient to allow the demodulation of the incoming signals in the concentrator 32. To reduce bit rate on the LSRN some digital processing is preferably carried out in the radio heads 36–38. However, even in this case, some digital signal processing may still be provided in the concentrator 32 as a shared resource for the radio heads 36–38. For example, channel coding and/or channel decoding may be performed in the concentrator 32 so that LSRN carries encoded user messages in the transmit and/or receive directions and the concentrator 32 extracts the user messages from the encoded signals received from the radio heads 36–38 and/or encodes the user messages for transmission to the radio heads 36–38.

The radio heads 36–38 of the present invention are preferably designed for low power operation in indoor environments, e.g. 10–20 mW. It is intended to use a relatively large number of low cost radio heads with a short radio coverage area to provide optimum service to limited areas of business offices. By setting up the radio heads in a number of selected positions, an optimum coverage can be obtained despite the radio energy loss by absorption as well as deflection by walls, ceilings, metal cabinets, partitions, doors, etc. It is anticipated that more than one radio head may receive signals from one mobile terminal. The signals from an individual mobile terminal may be isolated from the signals from other mobile terminals by differing slow frequency hopping schemes for each radio head and by time isolation by selecting different time slots within a frame for the different transmissions.

One advantage of carrying out the demodulation of the received radio samples in the concentrator 32 will be described with reference to FIGS. 8 and 9 each of which represents and embodiment of the present invention. As radio samples are transmitted over LAN 40 they can be combined in the signal processing unit 82 of the concentrator 32 in order to improve signal quality. The radio samples arrive at the SPU 82 over the samples bus 90 from the radio heads 36–38 via LAN 40 and LAN interface 83. Each radio heads 36–38 has two receivers so that there are two signals from each head, e.g. RX1 and RX2. These signals are extracted (demultiplexed) per user by multiplexer/demultiplexer 93. The RX1 and RX2 radio samples from the radio heads 36–38 are each combined together in combiners 91-1 and 91-2, respectively and passed for further processing, e.g. demodulation, deciphering, de-interleaving, channel, decoding etc. in SPU 82A. For instance, the output of the combiners 91-1 and 91-2 may be fed to a hard-decision, multi-input convolutional decoder in unit 82A, e.g. a Viterbi decoder as described in the article by A. J. Viterbi entitled "Error bounds for convolutional codes and an asymptotically optimum decoding algorithm", IEEE Trans. Inf. Theory, vol. IT 13 pages 260–269, April 1967. In the decoder all the input streams are decoded simultaneously to a single output. On the other hand, signals to be transmitted (TX1, TX2 for each radio head 36–38) are passed to multiplexer 93 after the relevant processing (e.g. channel coding, interleaving, ciphering etc.) in SPU 82A but without modulation, for transmission to the radio heads 36–38. It will be understood by the skilled person that combining the received signals from a plurality of radio heads 36–38 provides a form of spatial diversity.

Figure 9:
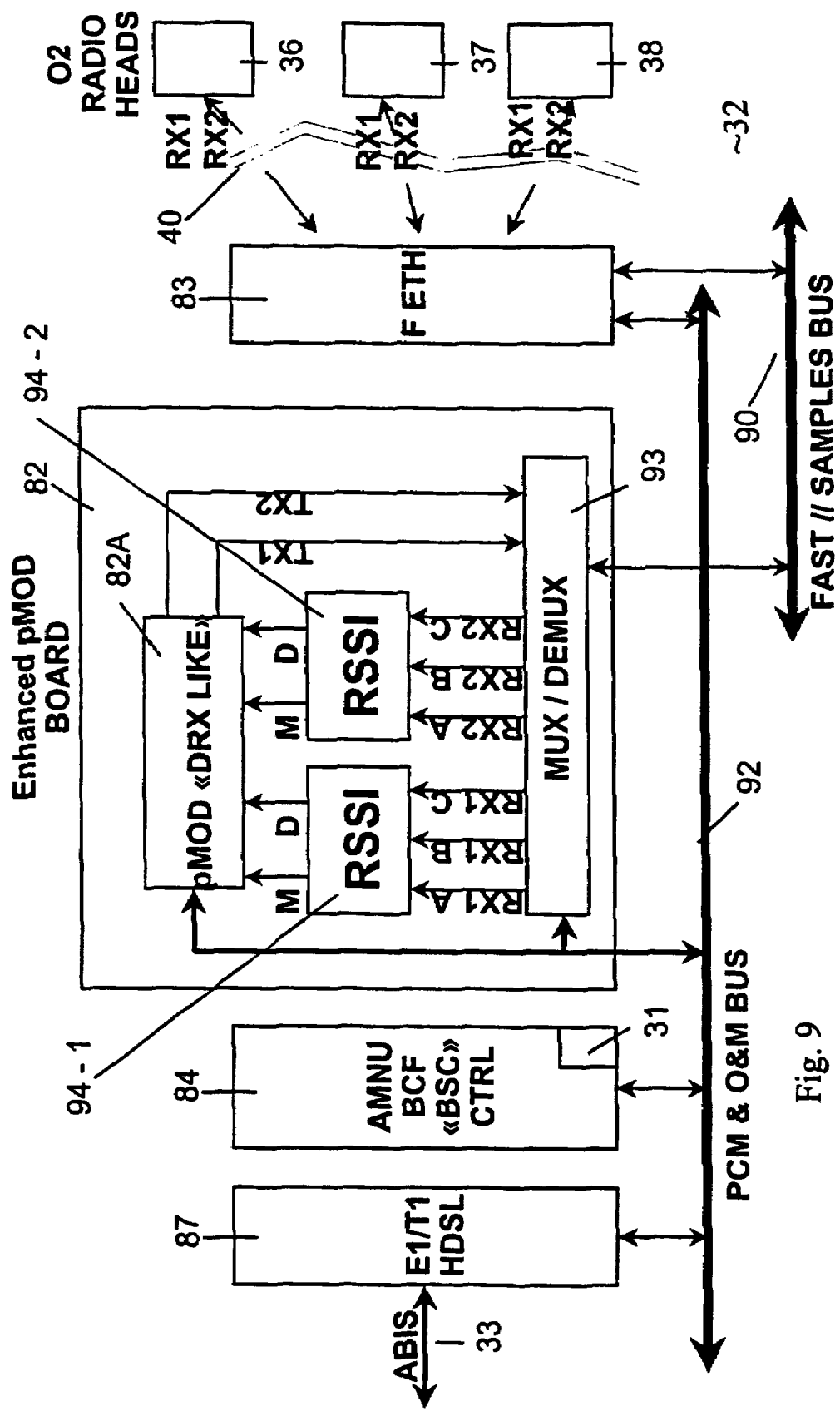
FIG. 9 is a schematic representation of a mobile telecommunications concentrator in accordance with yet another embodiment of the present invention.

An alternative and preferred embodiment is shown in FIG. 9 which is considered to be the best mode of carrying out the present invention. The items with the same reference numbers in FIGS. 8 and 9 refer to the same components unless described differently below. Just as described for FIG. 8, the received signals are extracted (demultiplexed) per user by multiplexer/demultiplexer 93. The RX1 and RX2 radio samples from the radio heads 36–38 are provided separately to two selectors 94-1 and 94-2. The selectors 94 determine which of the received signals RX1A . . . C; RX2A . . . C have the best signal quality. There are various measures of signal quality known to the skilled person which may be used for comparison purposes in accordance with the present invention, e.g. RSSI. The two best signals are then supplied to the digital signal processing unit 82A, e.g. to a multi-port Viterbi decoder as described with reference to FIG. 8.

A further embodiment of the present invention combines the selection function of FIG. 9 with limited diversity transmission. Once it has been determined by selectors 94-1 and 94-2 which of the received signals are to be used for user message extraction, the signals from other radio heads may be stopped. This reduces traffic on the LSRN. In accordance with this embodiment, once the selectors 94 have decided which signals are to be processed a message is sent to the LDTU's 70 of the relevant radio heads instructing them to block all received signals from the relevant mobile terminal 100.

Figure 10:
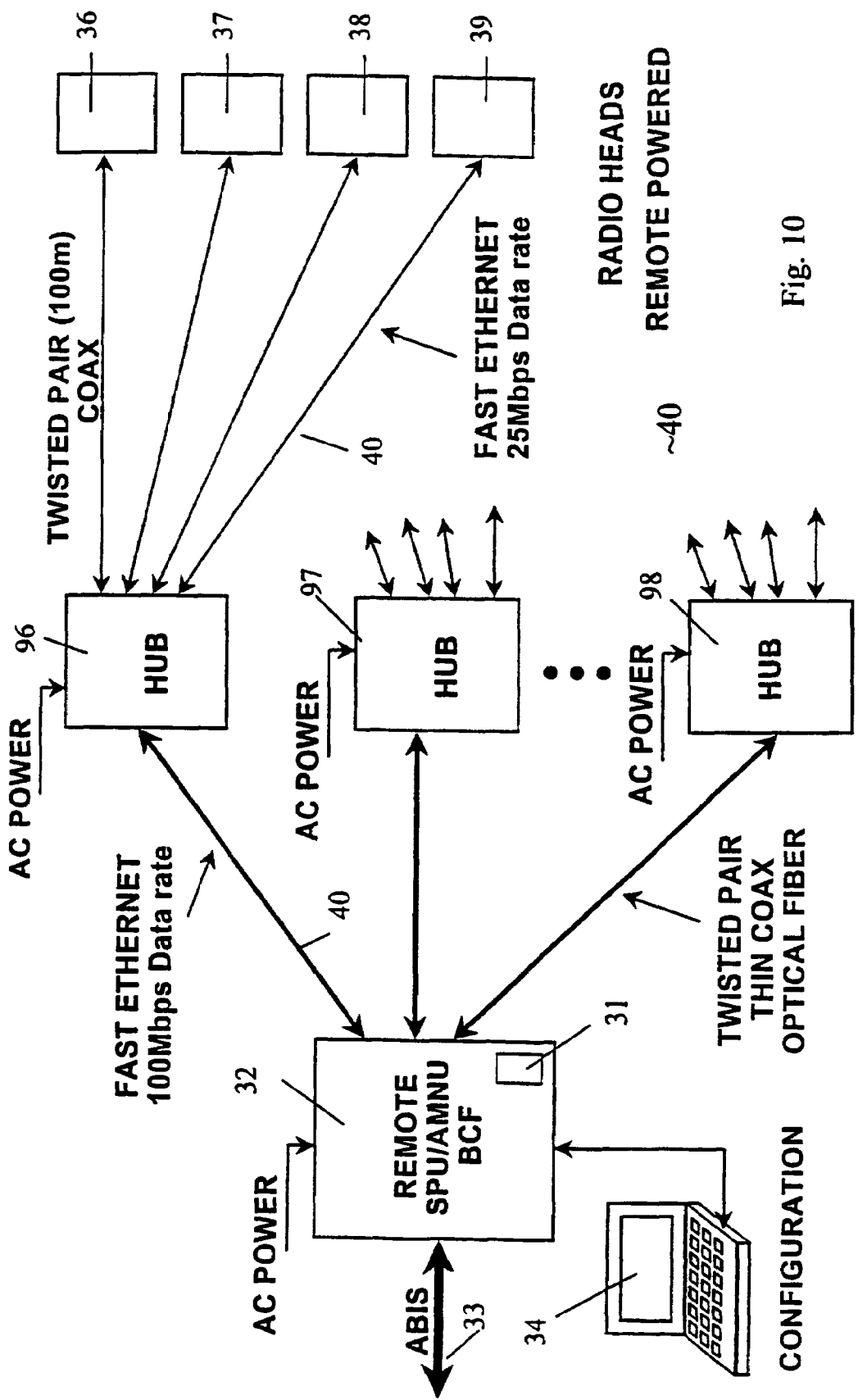
FIG. 10 is a schematic representation of a mobile telecommunications local network in accordance with an embodiment of the present invention.

A further embodiment of the present invention will be described with reference to FIG. 10 which is suitable when the size of the local mobile telecommunications network is large. A concentrator 32 communicates with remote radio heads 36–39 as a shared resource via a local shared resource network (LSRN) 40. The LSRN 40, 50 is organized with one or more hubs 96–98. Each hub 96–98 communicates with a group of radio heads 36–39 as a shared resource. The connections between the radio heads 36–39 and a hub 96–98 may have a lower bit rate than the connections from a hub 96–98 to the concentrator 32. For instance, each hub 96–98 may be in communication with the radio heads 36–39 via a wireless LAN. As the bit rate for the connection from a hub 96–98 to the concentrator 32 is higher this may be carried by a suitable solid medium, e.g. optical fiber or twisted pair. The concentrator 32 includes a timing generator 31 for generating a timing signal for synchronization of the operation of the radio heads. The concentrator 32 may include digital signal processing units (82 above) which are used as a shared resource for all radio heads 36–39. This allows specific optimization of the number of signal processing units and the number of radio heads as not all the radio heads and all the channels available to these will be operational simultaneously.

Figure 11:
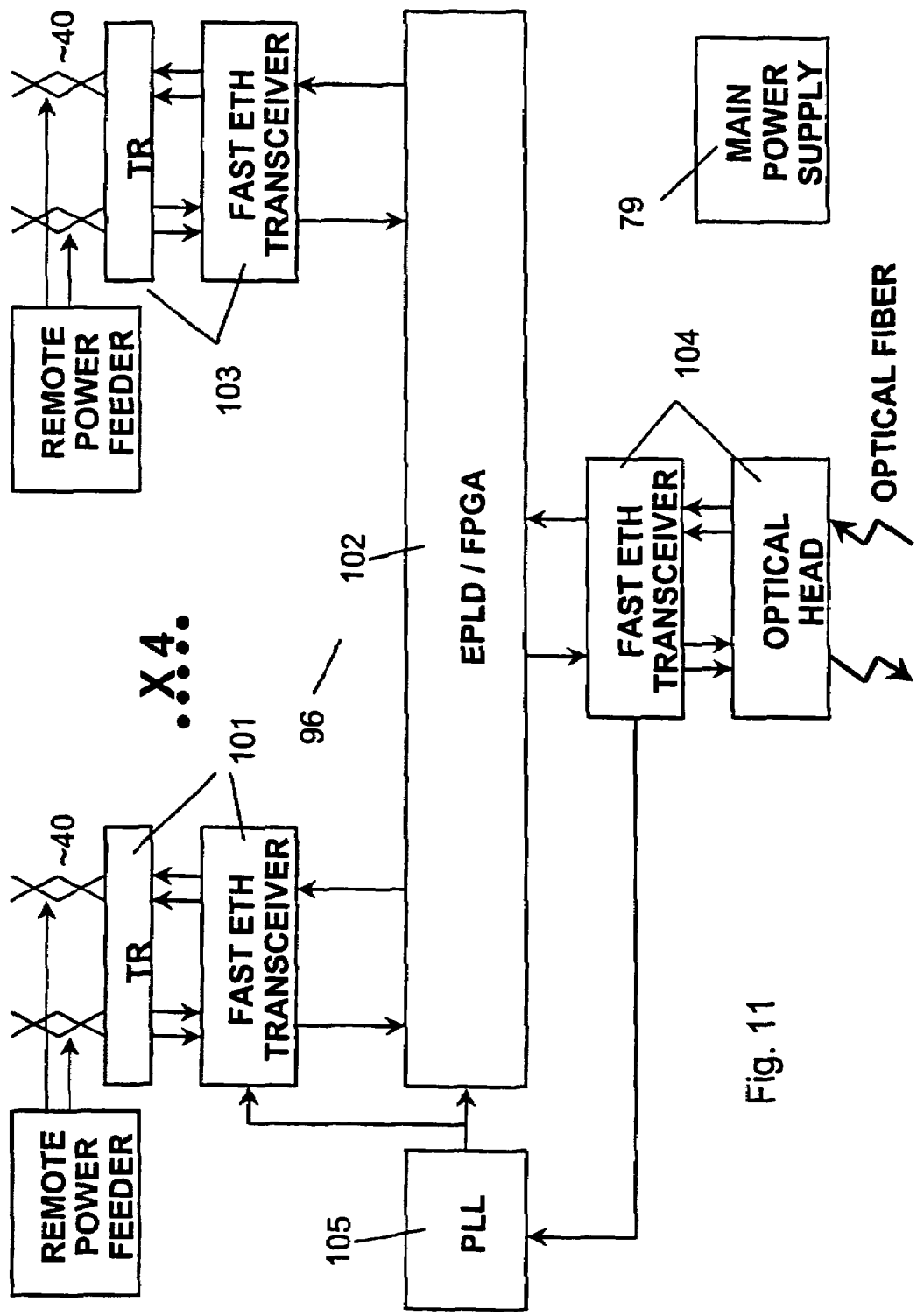
FIG. 11 is a schematic representation of a mobile telecommunications network hub in accordance with an embodiment of the present invention.

FIG. 11 is a schematic diagram of a hub 96 in accordance with an embodiment of the present invention. The purpose of the hub 96 is pass signals from the concentrator 32 to the radio heads 36–39 and vice versa. Each link to a radio head has a LAN interface 101, 103. The link to the concentrator has an interface 104. The physical medium used for transmission of the signals may be different in the two cases, e.g. twisted pair to the radio heads and optical fiber to the concentrator 32. A power supply 79 may be provided at each hub 96 which is used to supply power to the radio heads 36–39, e.g. down twisted pair connections, as well as for the hub 96. A phase locked loop 105 provides timing for the transceivers 101, 103 and for a processing unit 102 which provides the local intelligence to control the hub operation.

Figure 12:
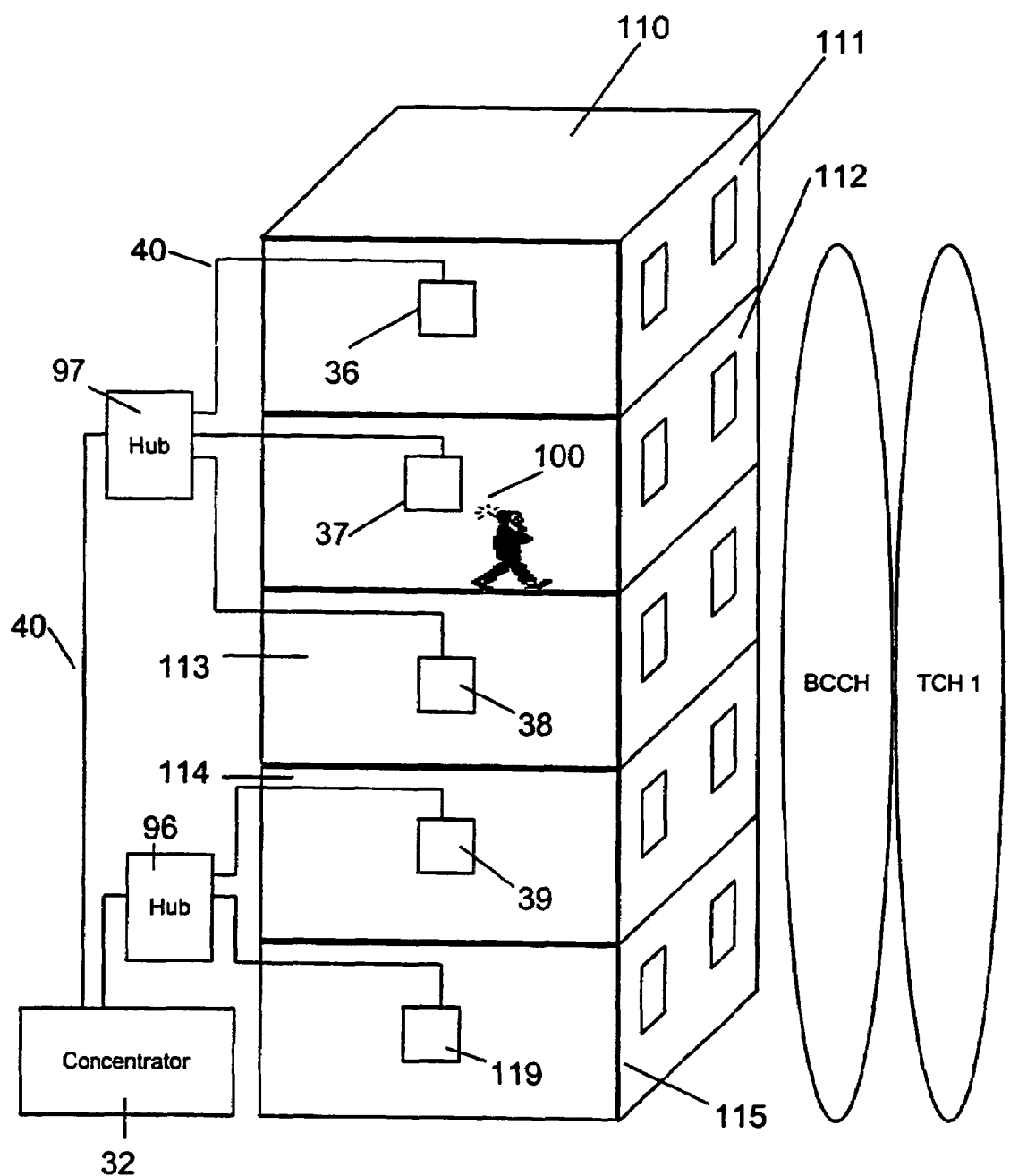
FIG. 12 is a schematic representation of a mobile telecommunications local network in accordance with an embodiment of the present invention.

FIG. 12 is an exemplary representation of an embodiment in accordance with the present invention. A building 110 has a number of floors or stories 11–115. On one or more floors 111–115, radio heads 36–39, 119 are located at strategic positions. Several of the radio heads 36–38; 39, 119 may be connected to hubs 97, 96 respectively, via a local shared resource network (e.g. a LAN) 40 or may be in radio contact with the hubs via a wireless LAN. The hubs 96, 97 or the radio heads 36–39, 119 are connected directly to a concentrator 32 as described above. The concentrator 32 may be connected to a mobile telephone communications system. Persons carrying mobile terminals 100 may make telephone calls via the radio heads 36–39, 119 and concentrator 32 to and through the mobile telecommunications system. The mobile terminals 100 are compatible with the mobile telecommunications system and the radio interface generated by the radio heads 36–39, 199 may be identical to a radio interface generated by a base transceiver station of the mobile telecommunications system. Hence, mobile terminals 100 do not need to be dual-mode terminals.

Generally, cellular wireless mobile telecommunication signals are organized in frames each frame having a number of slots, e.g. for the GSM system there are 8 slots to a frame. User messages may be isolated from each other by assigning a particular user to a slot. However, the present invention is not limited thereto and includes other methods of isolation, e.g. by code division in a CDMA system. Often a beacon or pilot signal is transmitted permanently at one frequency, i.e. the beacon or pilot frequency. This means that at the beacon or pilot frequency, a signal is transmitted for each time slot. This signal may be a control signal for the network, a traffic signal (user message) or a special signal when no other signal is being sent. The beacon or pilot signals are used by mobile terminals outside the building 110 to locate the nearest and strongest base station transceiver.

As explained above, the radio heads 36–39, 119 normally will have less capacity than all the TDMA channels available. For instance, as described above they may have a capacity of two TDMA channels. One way of organizing the mobile terminal telephone calls is shown schematically in FIG. 12. Here, two channels BCCH and TCH 1 are shared by all radio heads 36–39, 119. Each channel has frames with 8 time slots. The communications on BCCH and TCH 1 channels may be isolated from each other by using different frequencies. Certain network control signals must be transmitted on the BCCH so a reduced number of users may use this channel, e.g. 7 in a GSM system. This means that for one BCCH and one TCH, a total of 8 plus 7 or 15 calls may be processed simultaneously. To achieve this there must be two sets of signal processing units available in the concentrator 32. In the present example there are five radio heads 36–39, 119 but only two sets of signal processing units in the concentrator 32. This is an indication of the optimization of the local network—if individual complete indoor base stations were used in the same situation, there would have been 5 base stations each including there own signal processing units.

Figure 13:
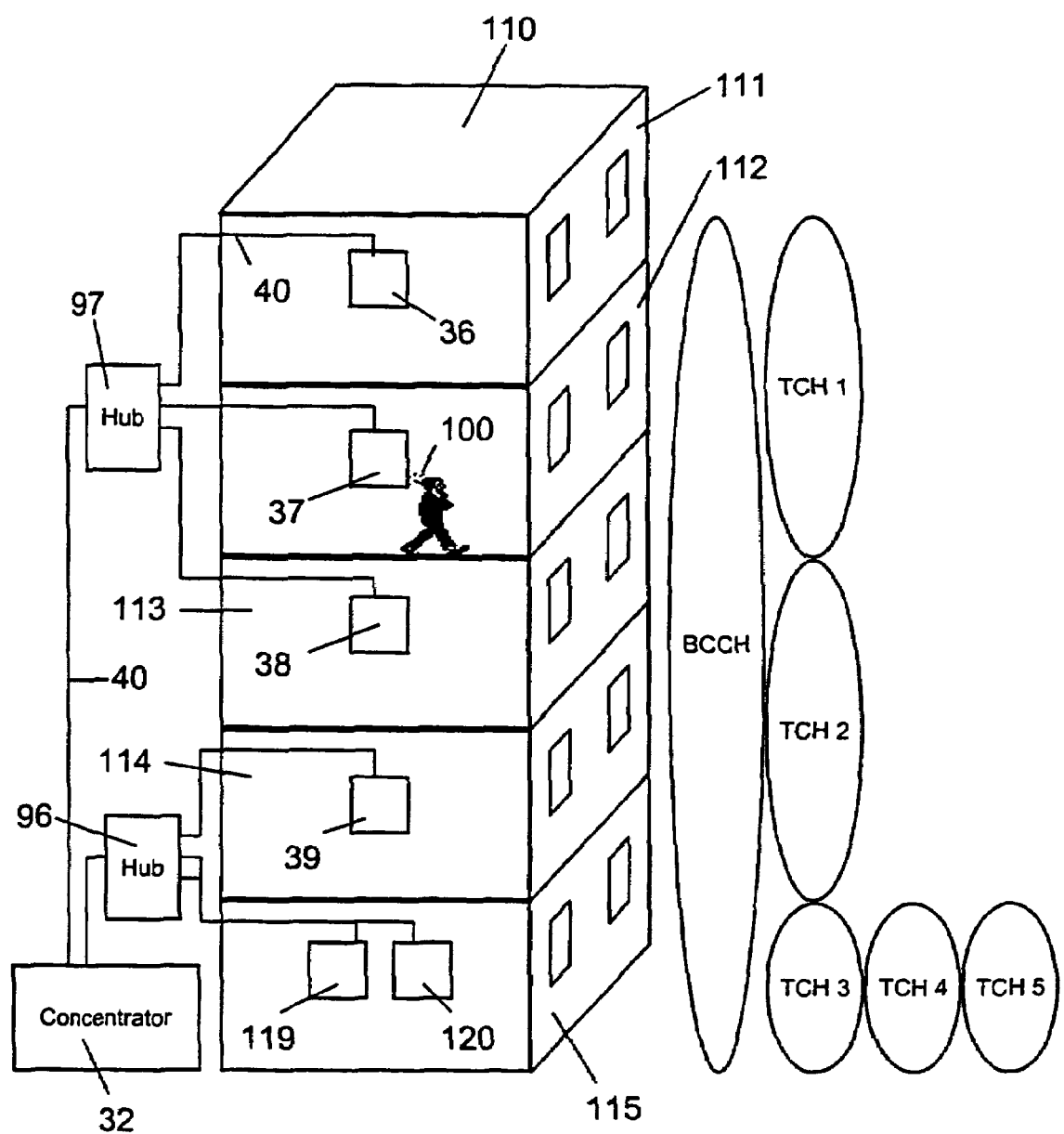
FIG. 13 is a schematic representation of a mobile telecommunications local network in accordance with another embodiment of the present invention.

A further embodiment is shown in FIG. 13. In this case the concentrator 32 has six signal processing units. There are six separate channels: BCCH, TCH1, TCH2, TCH3 and TCH4. The BCCH channel is common to all radio heads 36–39, 119. However, these channels are not spread evenly over the building 110. The BCCH channel is common to all radio heads 36–39, 119. however, TCH 1 one available to floors 111 and 112, TCH 2 to floors 113 and 114, and channels TCH 3, TCH 4 and TCH 5 to floor 115. This allows a maximum of 15 calls on each pair of floors 111, 112 and 113, 114 and a total on floor 115 of 31 calls with a total overall of 47 simultaneous calls.

Figure 14:
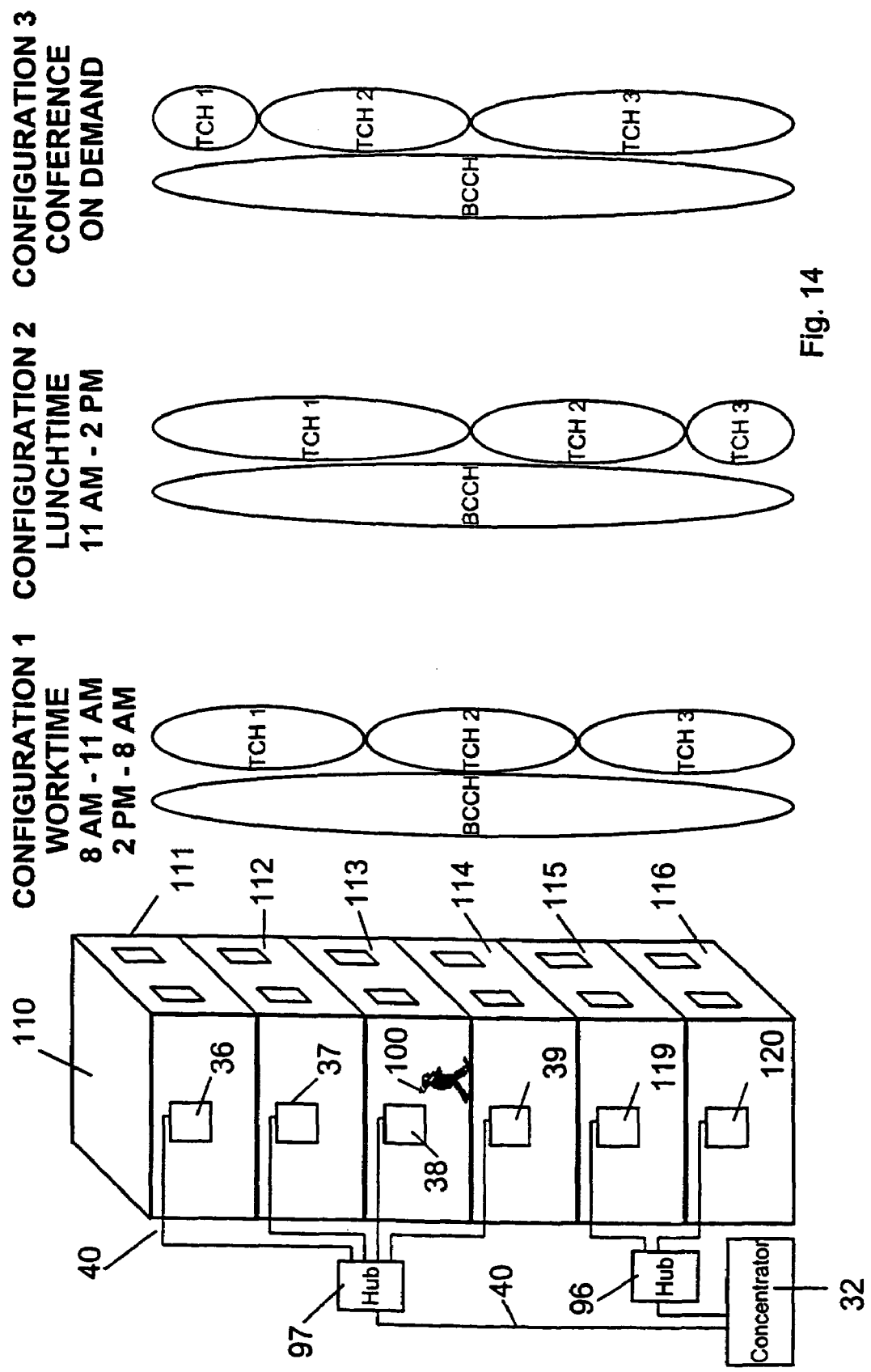
FIG. 14 is a schematic representation of a mobile telecommunications local network in accordance with yet another embodiment of the present invention.

FIG. 14 will be used to describe a further embodiment of the present invention. In this embodiment the configuration of the local system can be changed dynamically in order to meet changing loads. This dynamic adaption of the system may be managed by the LOMC 34. With respect to the mobile telecommunications network connected to concentrator 32, the internal organization of the local mobile telephone network in accordance with the present invention does not play a role. This internal organization may be organized by the concentrator and/or the LOMC as required. Assume that the concentrator 32 has 4 signal processing units. There are four channels, BCCH, TCH1, TCH2 and TCH3. Let us assume that the floor 120 is a restaurant in which mobile telephone calls may be concentrated into a lunch time period of 11 a.m. to 12 noon. Then for normal working hours outside lunch time, TCH 1–3 are distributed evenly over the floors. At lunch time, the restaurant is given a channel for itself, i.e. TCH3 which thus allows up to 15 simultaneous calls in the restaurant. A further possibility, is that a conference may be specifically booked for a certain time in the board room in floor 111. Then, at the appropriate time the conference is provided with TCH1 thus allowing 15 simultaneous calls on floor 111.

The method of handover between a mobile terminal 100 and the radio heads 36–38 for the networks described with reference to FIGS. 12 to 14 will now be described. As a single BCCH channel is broadcast by all heads, a single Base Station Identity Code (BSIC). Let us take for instance the case of a person using a mobile terminal 100 in a carpark in front of a building which includes a local network 20 in accordance with the present invention. Mobile terminal 100 monitors transmissions of the beacon signal from other cells, i.e. at some point it monitors the beacon signals from the radio heads 36–39, 119, 120. When these beacon signals are strong enough the mobile terminal 100 informs its present base station that it wishes to handover to the new base station which represents the local network 20. Handover is then performed in the normal way as if the radio heads 36–39, 119, 120 all belonged to a single base station. Once the handover is complete and the mobile terminal 100 is now transmitting via radio heads 36–39, 119, 120, the limited diversity transmission operation mentioned above may be deployed to reduce traffic on the LSRN. In this case, the selectors 94-1 and 94-2 of the concentrator 32 determine the best signals from all the signals received from radio heads 36–39, 119, 120 and the LDTU's 70 of the relevant radio heads are instructed to block reception of signals thus reducing traffic on the LSRN.

Handover in the reverse direction, i.e. from the local network 20 to the incumbent network is carried out using the reverse procedure.

The above procedures have to be modified for handovers between radio heads 36–39, 119, 120. In this case the mobile terminal 100 receives only one BSIC from all the radio heads 36–39, 119, 120. Requesting a handover to this BSIC would not be understood by the incumbent telecommunications system as the mobile terminal 100 is registered at this BSIC. In such a case the concentrator 32 is configured to block any handover request which contains the BSIC of its own local network 20. Handovers within the network 20 are controlled by the concentrator 32 and/or LOMC 34 based on suitable signal quality measurements. For instance, the decision for handover from one radio head to another may be determined by received signal strength (RSSI). This handover procedure may be orchestrated by the concentrator 32 and/or the LOMC 34. As an example the selection of radio signals by selectors 94-1 and 94-2 may be performed in the following way. Once the selectors 94-1 and 94-2 have performed the selection of signals RX1A . . . C, RX2A . . . C and the LTDU's 70 have restricted the radio samples passed through the LSRN to these selected ones, the selectors 94-1 and 94-2 are adapted to monitor the signal quality level of the selected signals. When one or both of the selected signals drop below a given threshold level, the restricted diversity transmission operation is terminated and a complete set of signals RX1A . . . C, RX2A . . . C is once again monitored. Once the new best signals are determined, the limited diversity transmission is applied which results in a hand-over to other radio heads 36–39, 119, 120. Handovers in which there is a change to a different channel are more complex and require interaction with the LOMC 34.

Figure 15:
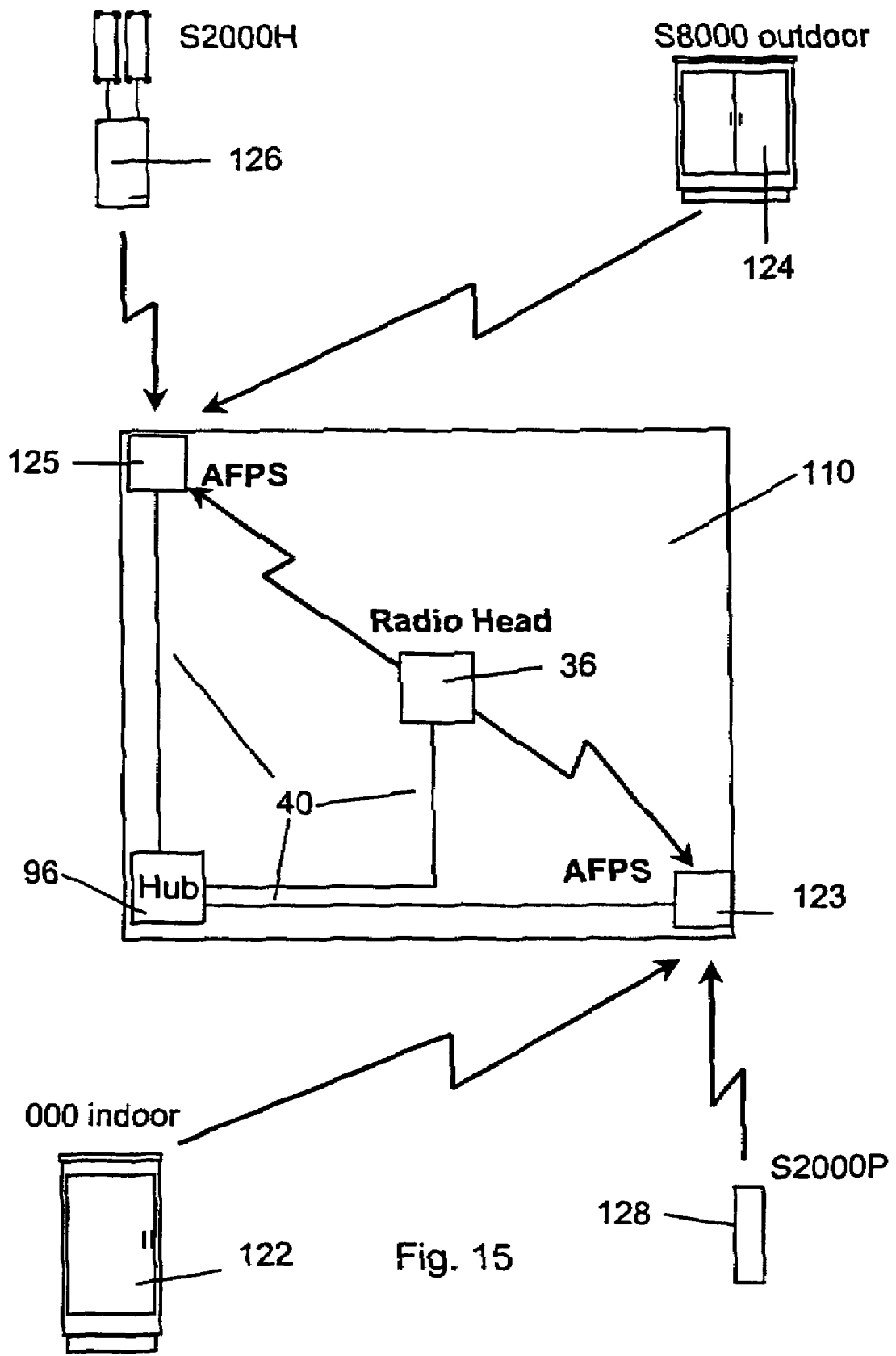
FIG. 15 is a schematic representation of a mobile telecommunications local network with downlink scanners in accordance with an embodiment of the present invention.

A further embodiment will be described with reference to FIG. 15. A local network 20 within a building may be heavily shielded by the walls of the building such that there is more flexibility with frequency selection than would be normally the case for a public mobile telecommunications network. Hence, some degree of local frequency selection may be tolerated without interfering too severely with the incumbent system. To allow selection of frequency suitable scanner units 123, 125 may be provided located at suitable positions in the building. The scanner units 123, 125 scan the frequencies of beacon signals in the incumbent network and monitor downlink beacon signal strengths from neighboring cells, e.g. they monitor downlink beacon signal frequencies from base stations 122, 124, 126, 128. The results are reported to the LOMC 34. Methods of monitoring downlink beacon signals are known to the skilled person as exemplified by International Patent Application WO96/31075. Antennae and scanning equipment for monitoring transmission channels of mobile telecommunication networks are well known to the skilled person a are not discussed here in detail. Of importance is that the scanner units 123, 125 are adapted to transmit the results of such scans to the LOMC 34 via LSRN 40, e.g. via hub 96, i.e. they are a shared resource on LAN 40. The present invention also includes that the monitoring scanner units 123, 125 are integrated into the operation of the radio heads 36–39, 119, 120 as has been described in co-pending European patent application EP 914 013 which is incorporated herein by reference.

Once LOMC 34 receives the results of the monitoring, a selection of the available frequencies in the incumbent system may be made for re-use in the local network 20. These selected frequencies may be transmitted by LOMC 34 to the OMC of the incumbent network for final approval if necessary. At regular intervals, e.g. between 2 and 3 in the morning, the scans by scanner units 123, 125 may be repeated and new frequencies selected if required. Alternatively, frequencies may be selected by LOMC 34 independently of the incumbent system. In this case, the methods of selection of transmission and receive frequencies described in co-pending European Patent Application EP 98400894.6 may be used in this case to advantage.

Figure 16:
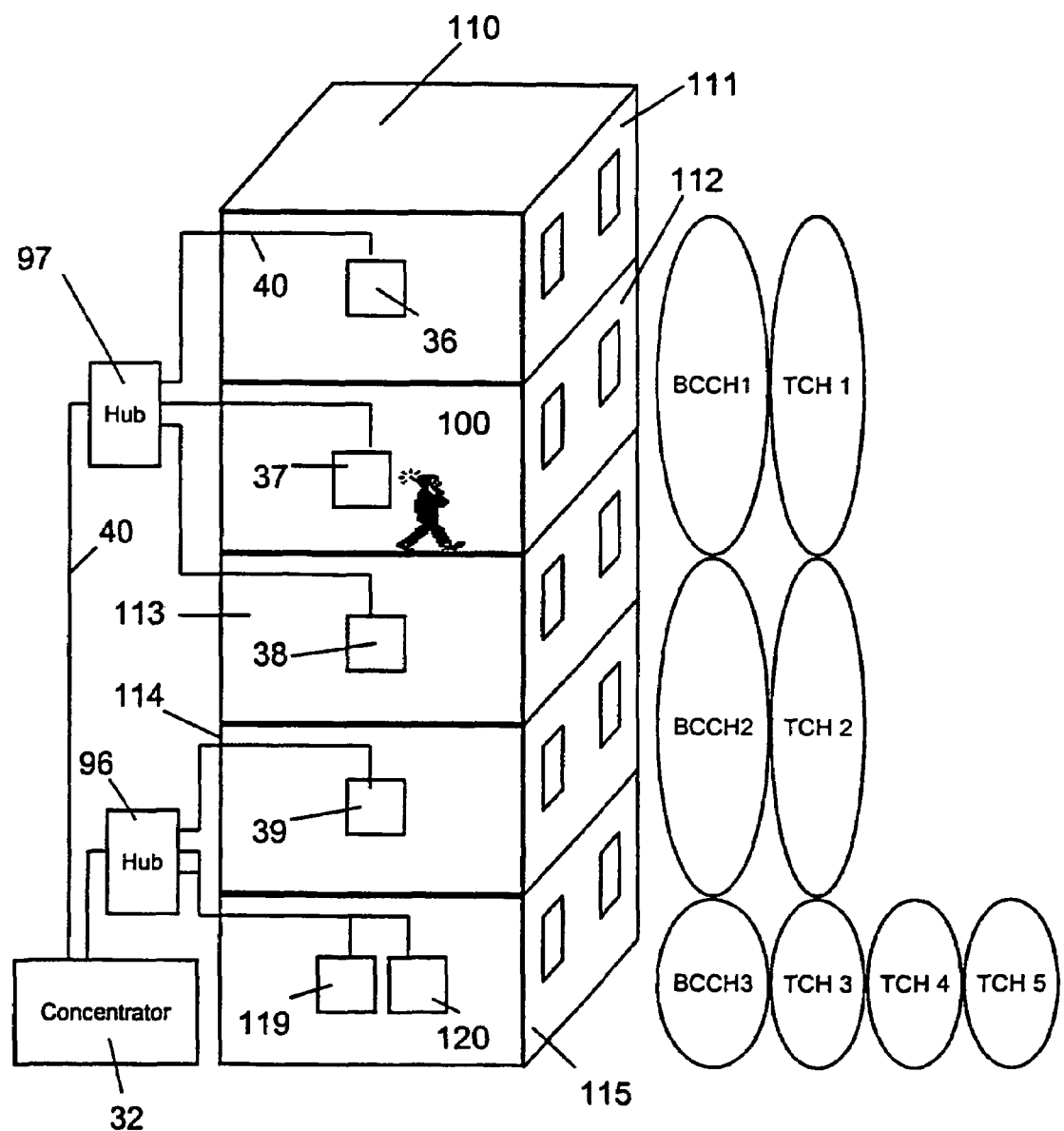
FIG. 16 is a schematic representation of a mobile telecommunications local network as a tri-sector cell-site in accordance with an embodiment of the present invention.

A further embodiment of the present invention will be described with reference to FIG. 16. Reference numbers in this figure which are the same as those in FIGS. 12–14 have the same meaning. In this embodiment The local network 20 represents a sectored cell-site of the incumbent mobile telecommunications network and not just a single base station. Accordingly, three beacon channels BCCH1, 2 and 3 may be distributed over the various radio heads 36–39, 119, 120. The partitioning of BCCH channels to radio heads may be controlled by LOMC 34 or may be fixed.

While the invention has been shown and described with reference to preferred embodiments, it will be understood by those skilled in the art that various changes or modifications in form and detail may be made without departing from the scope and spirit of this invention. For instance, units may be placed on the LSRN 20, 40, 50 for providing voice-mail or e-mail message storage. These units may be shared resources on the LSRN. Each radio head may comprise a single antenna for transmission without diversity and for reception with diversity in order to improve the quality of received messages. The incumbent mobile radio network may be a spread spectrum network and/or broadband network. For example the incumbent network may be a UMTS network and the interface between the concentrator and the incumbent network is the Iub interface of such a network.

The invention claimed is:

1. A first local mobile radio telecommunications network which is connectable to and compatible with a second mobile radio telecommunications network, the first local network comprising: a first and a second radio head for radio communication with one or more user terminals compatible with the second mobile radio telecommunications network; a concentrator connected to the radio heads by a local shared resource network, the radio heads being shared resources of the concentrator; the synchronization and frequency of a local timing signal of each of the first and second radio heads being controlled individually and remotely, wherein each of one or more of the radio heads includes at least two fixed gain receiver amplifiers and a unit for selecting the output of one of the amplifiers.

2. The first local mobile radio telecommunications network according to claim 1, wherein the concentrator performs the remote control.

3. The first local mobile radio telecommunications network according to claim 1, wherein the first and second radio head and the concentrator form one base station.

4. The first local mobile radio telecommunications network according to claim 1, wherein the concentrator includes at least a digital signal processing unit, the digital signal processing unit being a shared resource for the radio heads.

5. The first local mobile radio telecommunications network according to claim 1, wherein, the concentrator includes at least one of:
   a channel coder for channel coding messages to be transmitted from one or more of the radio heads, the channel coder being a shared resource for the one or more radio heads; a channel decoder, the channel decoder being a shared resource for the one or more radio heads;
   an equalizer, the equalizer being a shared resource for the one or more radio heads; a demodulator for demodulating radio samples from the one or more radio heads, the demodulator being a shared resource for the one or more radio heads,
   a modulator, the modulator being a shared resource for the one or more radio heads;
   a digital filter, the digital filter being a shared resource for the one or more radio heads;
   an encrypter, the encrypter being a shared resource for the one or more radio heads; a decrypter, the decrypter being a shared resource for the one or more radio heads.

6. The first local mobile radio telecommunications network according to claim 1, further comprising a scanning unit to scan transmissions from sources of radio energy, the scanning unit being a shared resource on the local shared resource network.

7. The first local mobile radio telecommunications network according to claim 1 wherein the selection unit is adapted to select none of the outputs of the amplifiers of one of the one or more radio heads.

8. The first local mobile radio telecommunications network according to claim 1, wherein each of one or more of the radio heads include at least two receivers and each one or more radio head is adapted to transmit the two received radio signals from the two receivers to the concentrator via the local shared resource network and the concentrator includes a selector circuit to select one of the two signals for digital signal processing.

9. The first local mobile radio telecommunications network according to claim 1, wherein two or more radio heads are adapted to receive signals transmitted from a user terminal and the concentrator is adapted to combine the signals from the two or more radio heads before digital signal processing the combined signals.

10. The first local mobile radio telecommunications network according to claim 1, wherein two or more radio heads are adapted to receive signals transmitted from a user terminal and to transmit these to the concentrator via the local shared resource network and the concentrator is adapted to select the signals from one of the radio heads.

11. The first local mobile radio telecommunications network according to claim 10, wherein the first network is adapted to prevent the received signals of the not-selected radio heads from being transmitted through the local shared resource network.

12. The first local mobile radio telecommunications network according to claim 1, the first network having means to transmit a beacon signal from two or more radio heads, each signal being transmitted with a selectable delay.

13. A method of operating a first local radio telecommunications network which is connected to and compatible with a second mobile radio telecommunications network, comprising the steps of: transmitting radio signals from a first and a second radio head to one or more user terminals compatible with the second mobile radio telecommunications network, a concentrator being connected to the local shared resource network, the concentrator and the radio heads being shared resources of a local shared resources network; and remotely controlling the frequency and synchronization of a local timing signal of each of the first and second radio heads individually, wherein each of one or more of the radio heads includes at least two fixed gain receiver amplifiers, further comprising the step of selecting the output of one of the amplifiers.

14. The method according to claim 13 wherein the remote control step is performed by the concentrator.

15. The method according to claim 13, further comprising:
digital signal processing radio signals received by the radio heads in the concentrator.

16. The method according to claim 15, further comprising at least one of the following steps in the concentrator:
demodulating radio samples received from the one or more radio heads;
modulating radio samples to be transmitted to one or more radio heads;
channel decoding of radio samples received from the one or more radio heads;
channel coding of messages to be transmitted from one or more of the radio heads;
filtering of digital signals to or from the one or more radio heads;
encryption or decryption of digital signals to or from the one or more radio heads;
channel equalization of digital signal to or from the one or more radio heads.

17. The method according to claim 13, further comprising the step of scanning transmissions from sources of radio energy.

18. The method according to claim 13, further comprising the step of preventing any of the outputs from the amplifiers of a radio head being transmitted over the local shared resource network.

19. The method according to claim 13, wherein two or more radio heads are adapted to receive signals transmitted from a user terminal, further comprising the step of combining the signals from the two or more radio heads before digital signal processing the combined signals.

20. The method according to claim 13, wherein two or more radio heads are adapted to receive signals transmitted from a user terminal, further comprising the steps of: transmitting the received signals over the local shared resource network to the concentrator and selecting the signals from one of the radio heads in the concentrator for digital signal processing.

21. The method according to claim 20, further comprising the step of preventing the received signals of the not-selected radio head from being transmitted through the local shared resource network.

22. The method according to claim 13, further comprising the steps of transmitting a beacon signal from two or more radio heads, each signal being transmitted with a selectable delay.

23. A concentrator for connection on one side to a mobile radio telecommunications network and for connection on another side for use as a shared resource on a local shared resource network having a plurality of radio heads as shared network components; the concentrator comprising: an interface to the local shared resource network; and the concentrator being adapted to control remotely and for each individual radio head both synchronization and frequency of a local timing signal required for the operation of the radio heads, the concentrator is adapted to prevent transmission from one of the radio heads to and through the local shared resource network of received signals at the one radio head.

24. The concentrator of claim 23, wherein the concentrator includes at least a digital signal processing unit, the digital signal processing unit being a shared resource for the radio heads.

25. The concentrator of claim 23, including at least one of:
a channel coder for channel coding messages to be transmitted from one or more of the radio heads, the channel coder being a shared resource for the one or more radio heads;
a channel decoder, the channel decoder being a shared resource for the one or more radio heads;
an equalizer, the equalizer being a shared resource for the one or more radio heads;
a demodulator for demodulating radio samples from the one or more radio heads, the demodulator being a shared resource for the one or more radio heads,
a modulator, the modulator being a shared resource for the one or more radio heads;
a digital filter, the digital filter being a shared resource for the one or more radio heads;
an encrypter, the encrypter being a shared resource for the one or more radio heads;
a decrypter, the decrypter being a shared resource for the one or more radio heads.

26. The concentrator according to claim 23, wherein each of one or more of the radio heads includes at least two receivers and each one or more radio head is adapted to transmit the two received radio signals from the two receivers to the concentrator via the local shared resource network and the concentrator includes a selector circuit to select one of the two signals for digital signal processing.

27. The concentrator of claim 23, wherein two or more radio heads are adapted to receive signals transmitted from a user terminal and the concentrator is adapted to combine the signals from the two or more radio heads before digital signal processing the combined signals.

28. The concentrator of claim 23, wherein two or more radio heads are adapted to receive signals transmitted from a user terminal and to transmit these to the concentrator via the local shared resource network and the concentrator is adapted to select the signals from one of the radio heads.

29. A radio head for connection on one side for use as a shared resource on a local shared resource network and on another side for communicating with user terminals of a radio telecommunications network via an air interface; the radio head comprising: an interface to the local shared resource network; a synchronizing unit for receiving signals from the local shared resource network for remote control of the synchronization and frequency of a local timing signal required for the operation of the radio head, the radio head having at least two fixed gain receiver amplifiers and a unit for selecting the output of one of the amplifiers.

30. A concentrator for connection on one side to a mobile radio telecommunications network and for connection on another side for use as a shared resource on a local shared resource network having a plurality of radio heads as shared network components; the concentrator comprising: an interface to the local shared resource network; and the concentrator being adapted to control remotely and for each individual radio head both synchronization and frequency of a local timing signal required for the operation of the radio heads wherein each of one or more of the radio heads include at least two receivers and each one or more radio head is adapted to transmit the two received radio signals from the two receivers to the concentrator via the local shared resource network and the concentrator includes a selector circuit to select one of the two signals for digital signal processing.

31. The concentrator of claim 30, wherein the concentrator includes at least a digital signal processing unit, the digital signal processing unit being a shared resource for the radio heads.

32. The concentrator of claim 30, including at least one of:
 a channel coder for channel coding messages to be transmitted from one or more of the radio heads, the channel coder being a shared resource for the one or more radio heads;
 a channel decoder, the channel decoder being a shared resource for the one or more radio heads;
 an equalizer, the equalizer being a shared resource for the one or more radio heads;
 a demodulator for demodulating radio samples from the one or more radio heads, the demodulator being a shared resource for the one or more radio heads,
 a modulator, the modulator being a shared resource for the one or more radio heads;
 a digital filter, the digital filter being a shared resource for the one or more radio heads;
 an encrypter, the encrypter being a shared resource for the one or more radio heads;
 a decrypter, the decrypter being a shared resource for the one or more radio heads.

33. The concentrator according to claim 30, wherein each of one or more of the radio heads includes at least two receivers and each one or more radio head is adapted to transmit the two received radio signals from the two receivers to the concentrator via the local shared resource network and the concentrator includes a selector circuit to select one of the two signals for digital signal processing.

34. The concentrator of claim 30, wherein two or more radio heads are adapted to receive signals transmitted from a user terminal and the concentrator is adapted to combine the signals from the two or more radio heads before digital signal processing the combined signals.

35. The concentrator of claim 30, wherein two or more radio heads are adapted to receive signals transmitted from a user terminal and to transmit these to the concentrator via the local shared resource network and the concentrator is adapted to select the signals from one of the radio heads.

36. A first local mobile radio telecommunications network which is connectable to and compatible with a second mobile radio telecommunications network, the first local network comprising: a first and a second radio head for radio communication with one or more user terminals compatible with the second mobile radio telecommunications network; a concentrator connected to the radio heads by a local shared resource network, the radio heads being shared resources of the concentrator; the synchronization and frequency of a local timing signal of each of the first and second radio heads being controlled individually and remotely, wherein the first and second radio head and the concentrator form one base station.

\* \* \* \* \*